(12) United States Patent
Parkey et al.

(10) Patent No.: US 10,875,793 B2
(45) Date of Patent: Dec. 29, 2020

(54) INTEGRATED ENERGY GENERATION AND DESALINATION SYSTEM AND METHOD

(71) Applicant: Lynntech, Inc., College Station, TX (US)

(72) Inventors: Jeffrey S. Parkey, College Station, TX (US); Justin McIntire, Bryan, TX (US); Carlos Salinas, Bryan, TX (US)

(73) Assignee: Lynntech, Inc., College Station, TX (US)

( * ) Notice: Subject to any disclaimer, the term of this patent is extended or adjusted under 35 U.S.C. 154(b) by 9 days.

(21) Appl. No.: 16/283,286

(22) Filed: Feb. 22, 2019

(65) Prior Publication Data

US 2020/0024159 A1 Jan. 23, 2020

Related U.S. Application Data

(60) Provisional application No. 62/634,443, filed on Feb. 23, 2018.

(51) Int. Cl.
| | |
|---|---|
| *C02F 1/469* | (2006.01) |
| *C02F 103/08* | (2006.01) |
| *H01M 8/18* | (2006.01) |
| *H01M 8/22* | (2006.01) |

(52) U.S. Cl.
CPC .......... *C02F 1/4695* (2013.01); *H01M 8/188* (2013.01); *H01M 8/227* (2013.01); *C02F 2103/08* (2013.01); *C02F 2201/4611* (2013.01); *C02F 2201/46115* (2013.01); *C02F 2303/10* (2013.01)

(58) Field of Classification Search
None
See application file for complete search history.

(56) References Cited

U.S. PATENT DOCUMENTS

| | | |
|---|---|---|
| 4,950,561 A | 8/1990 | Niksa et al. |
| 9,673,472 B2 | 6/2017 | Volkel et al. |
| 2011/0311887 A1* | 12/2011 | He .......................... H01M 8/16 429/401 |

OTHER PUBLICATIONS

Chen, F et al., "Dual-ions electrochemical deionization: a desalination generator," Energy & Environmental Science 10, Jul. 13, 2017, pp. 2081-2089.

(Continued)

*Primary Examiner* — Bradley R Spies
(74) *Attorney, Agent, or Firm* — Edwin S. Flores; Chalker Flores, LLP

(57) ABSTRACT

The present invention includes a method including providing an anode and a cathode; providing a desalination device operably coupled to establish an electrical potential between the anode and the cathode when the desalination device is operating; providing water containing dissolved solids; thereby establishing the electrical potential; reducing a salinity of the water by supplying the water to the desalination device; and generating electrical power by reducing the salinity of the water.

19 Claims, 27 Drawing Sheets

(56) References Cited

OTHER PUBLICATIONS

Desai, D. et al., "Electrochemical Desalination of Seawater and Hypersaline Brines with Coupled Electricity Storage," ACS Energy Letters 3, 2018, pp. 375-379.
Lee, J., et al., "Rocking Chair Desalination Battery Based on Prussian Blue Electrodes," ACS Omega 2, Apr. 26, 2017, pp. 1653-1659.
Nam, D.-H., et al., "Bismuth as a New Chloride-Storage Electrode Enabling the Construction of a Practical High Capacity Desalination Battery," Journal of the American Chemical Society 139, Aug. 4, 2017, pp. 11055-11063.
Pasta, M., et al., "A Desalination Battery," Nano Letters 12, Jan. 23, 2012, pp. 839-843.

* cited by examiner

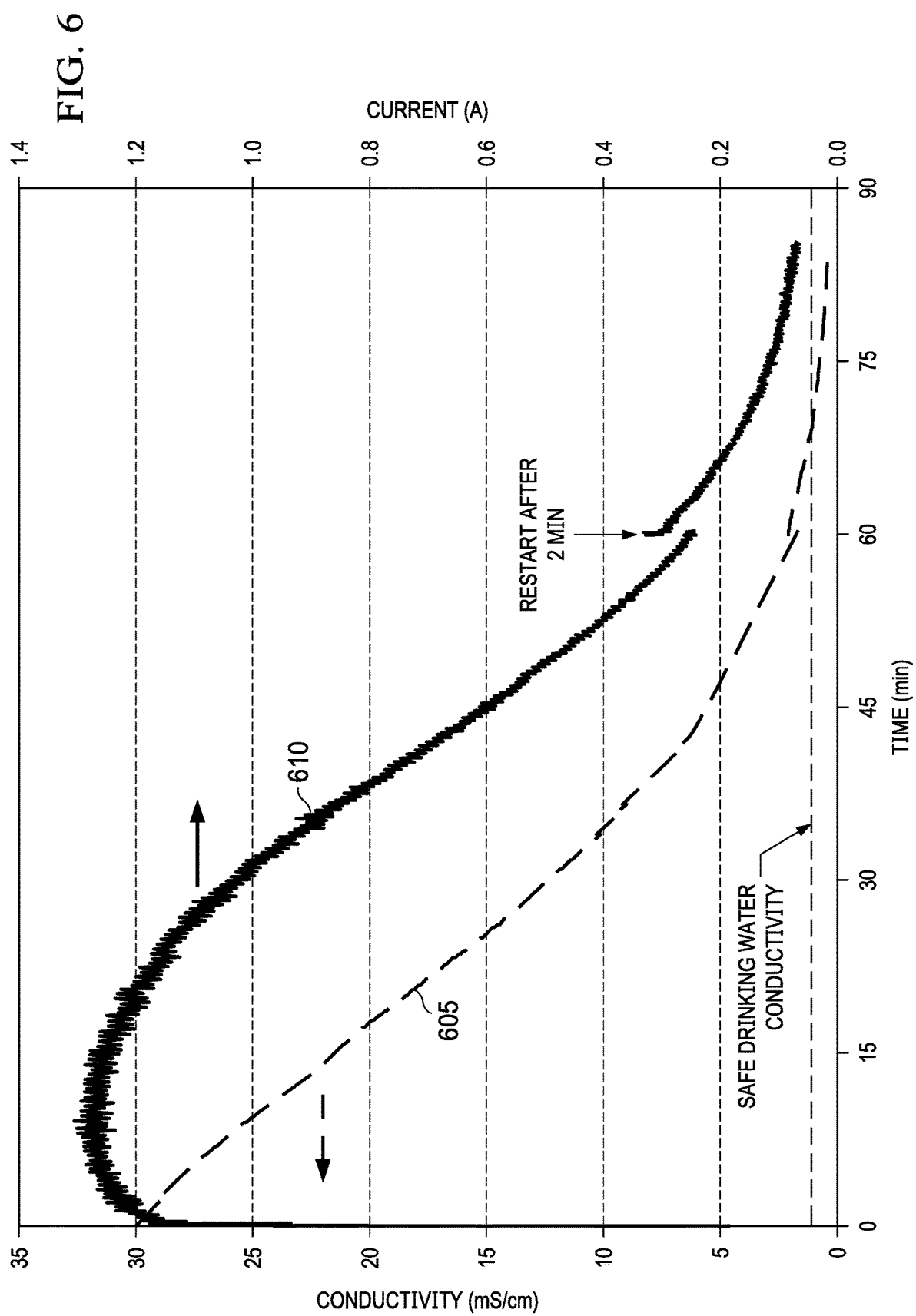

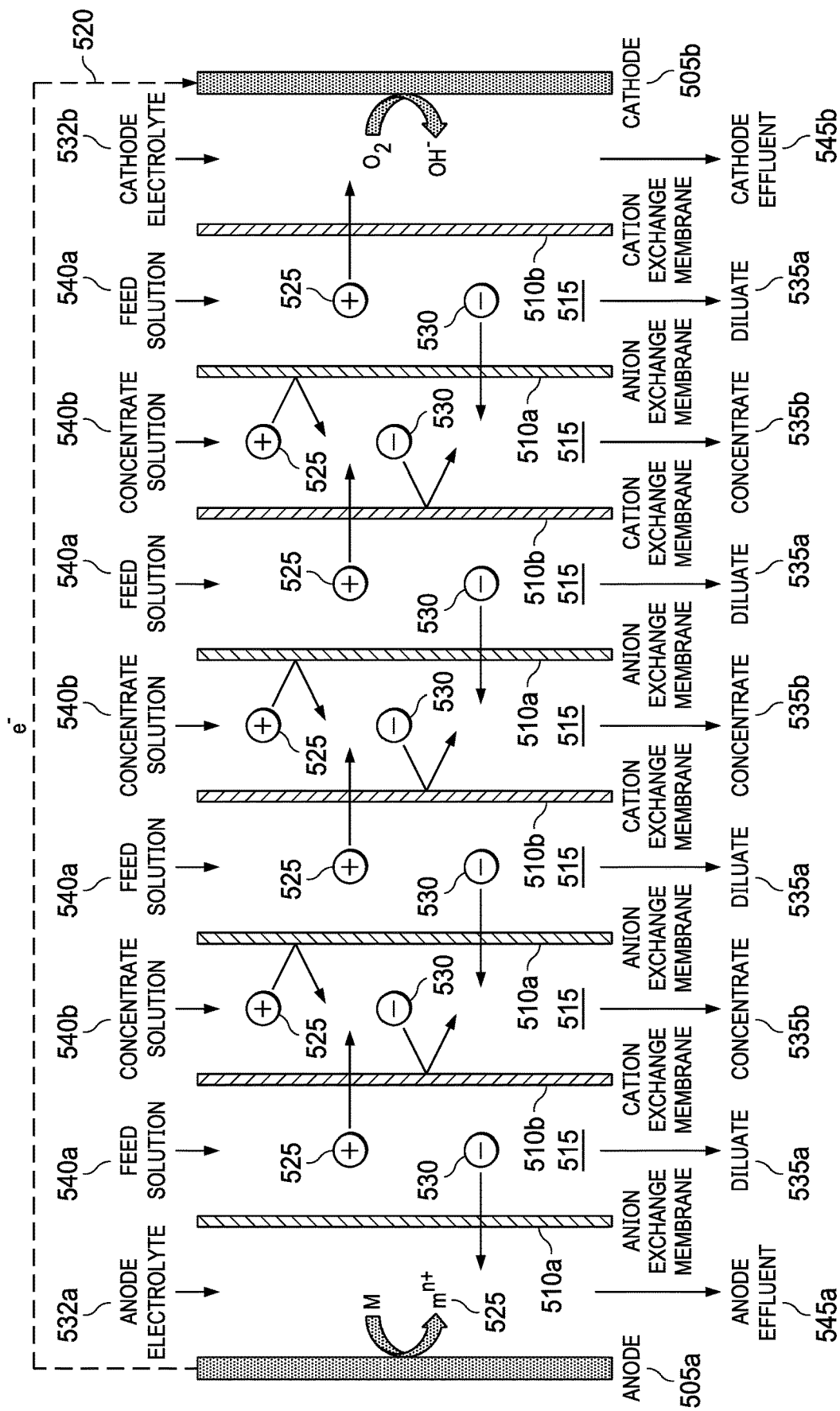

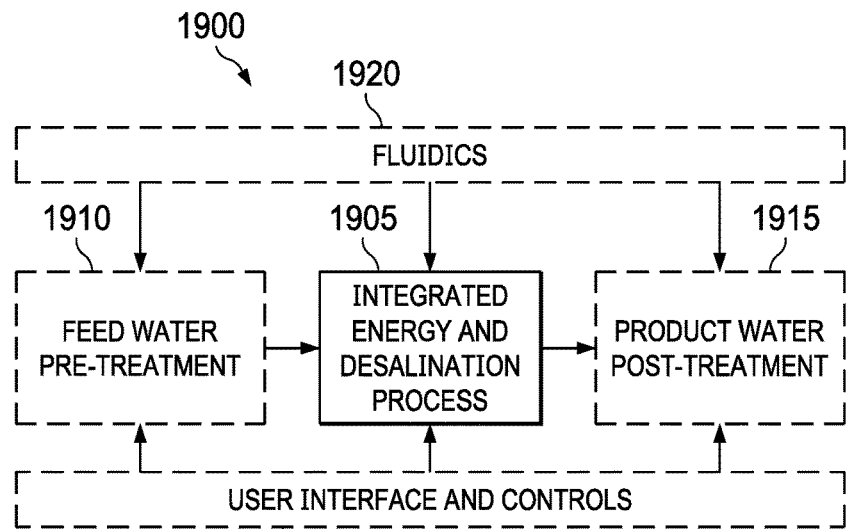
FIG. 19
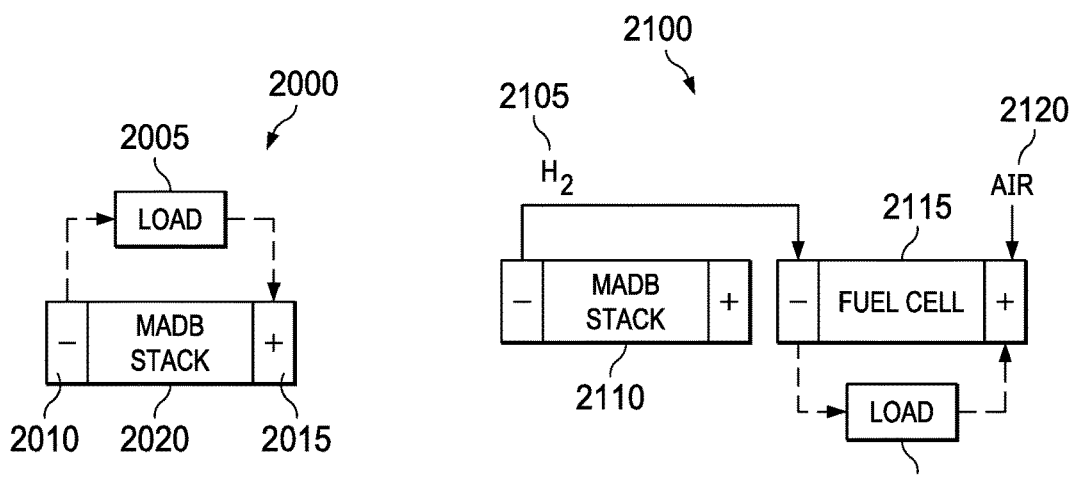
FIG. 20
FIG. 21
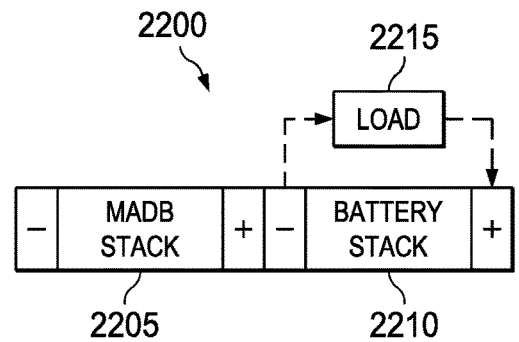
FIG. 22

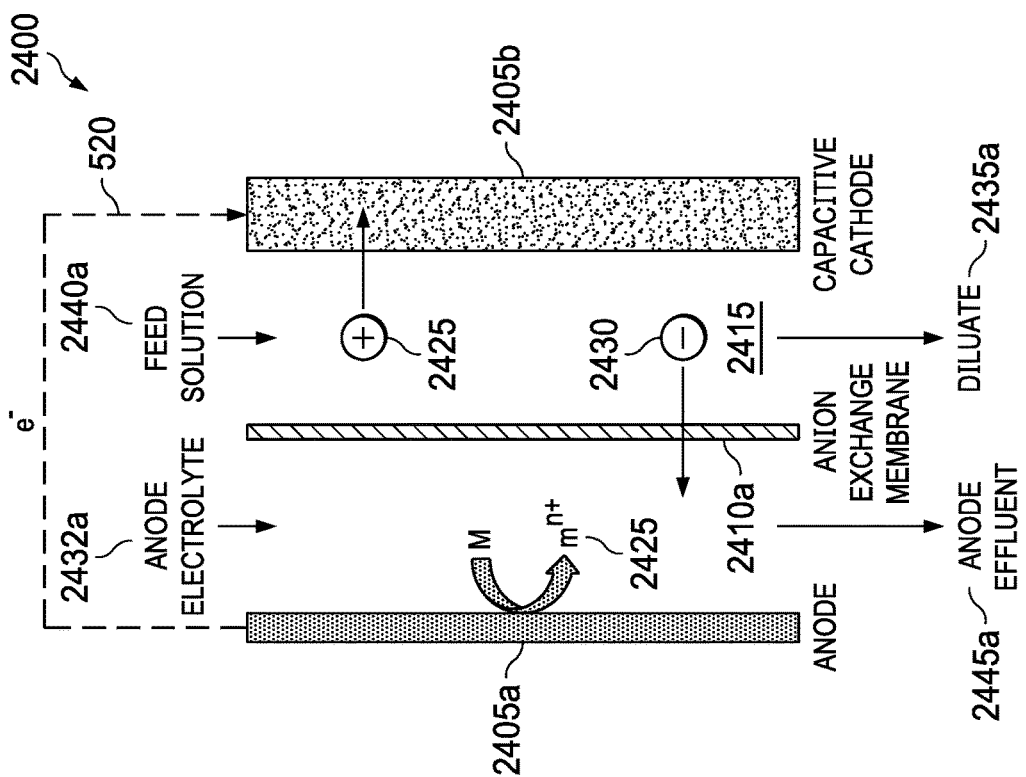
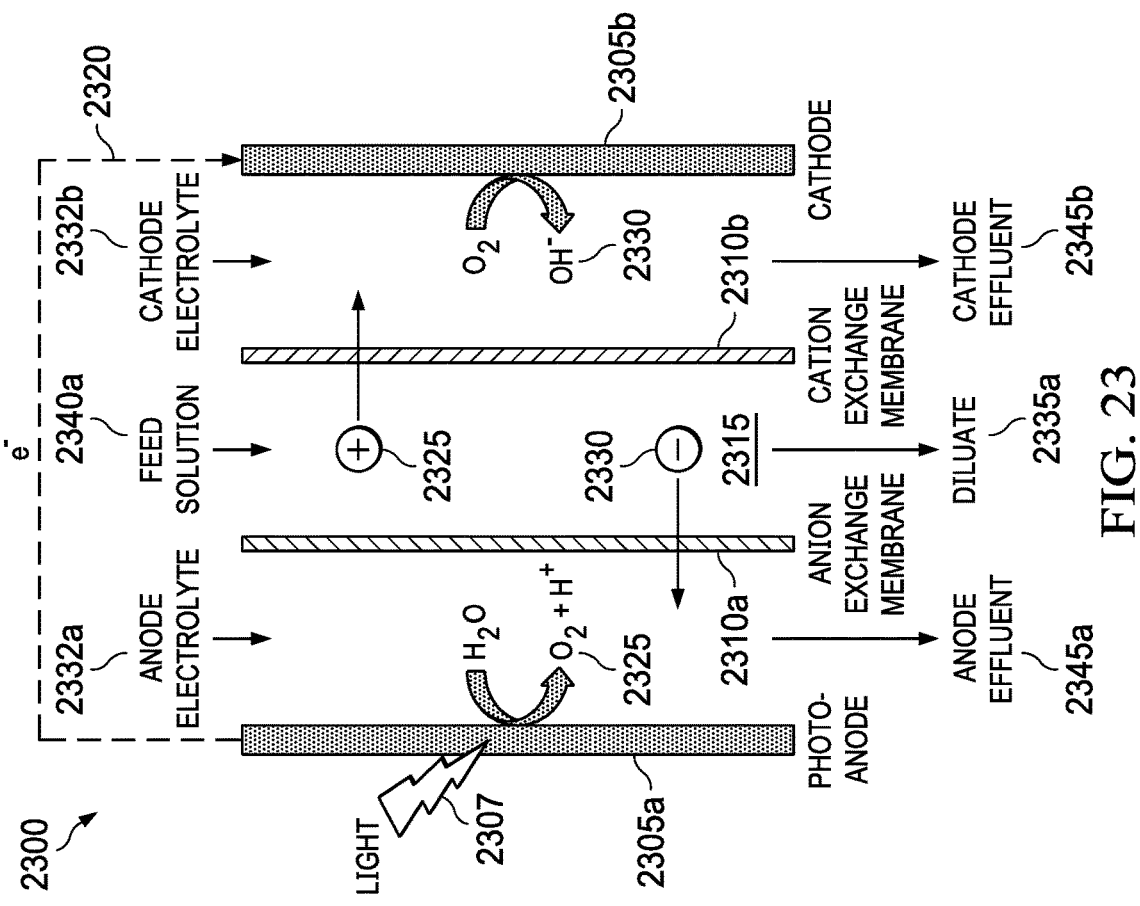
FIG. 23
FIG. 24

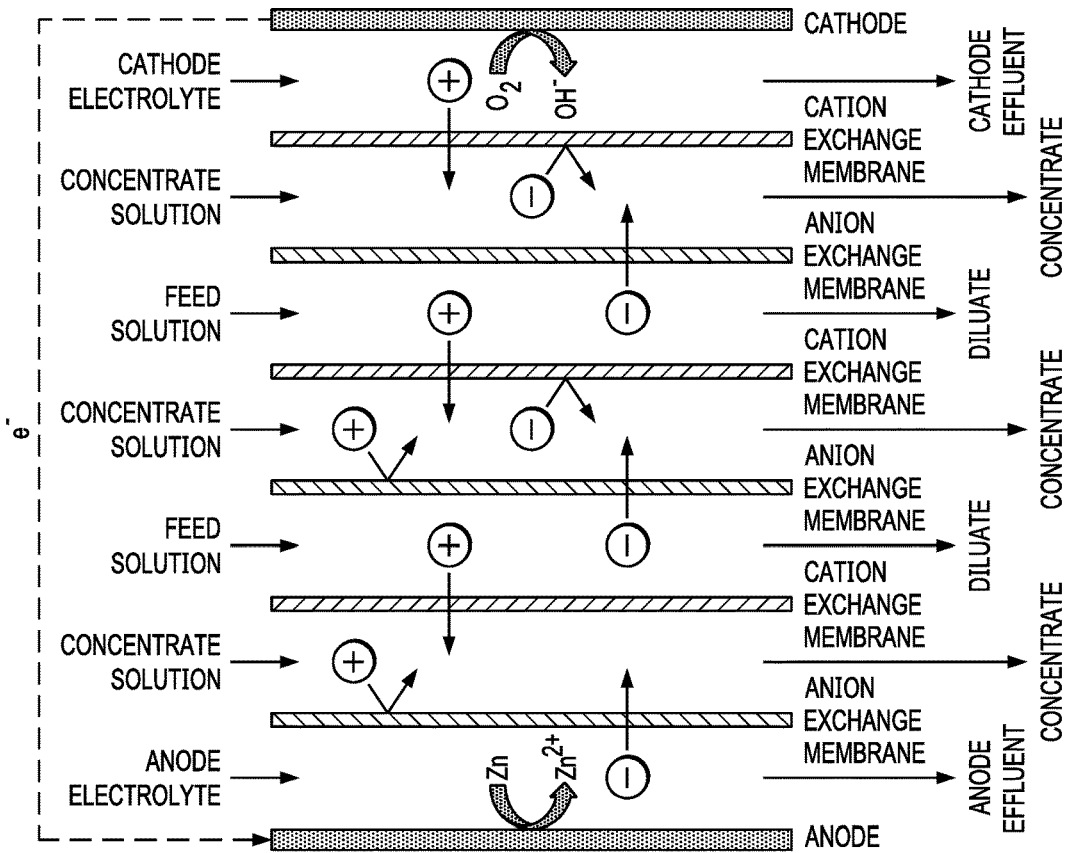
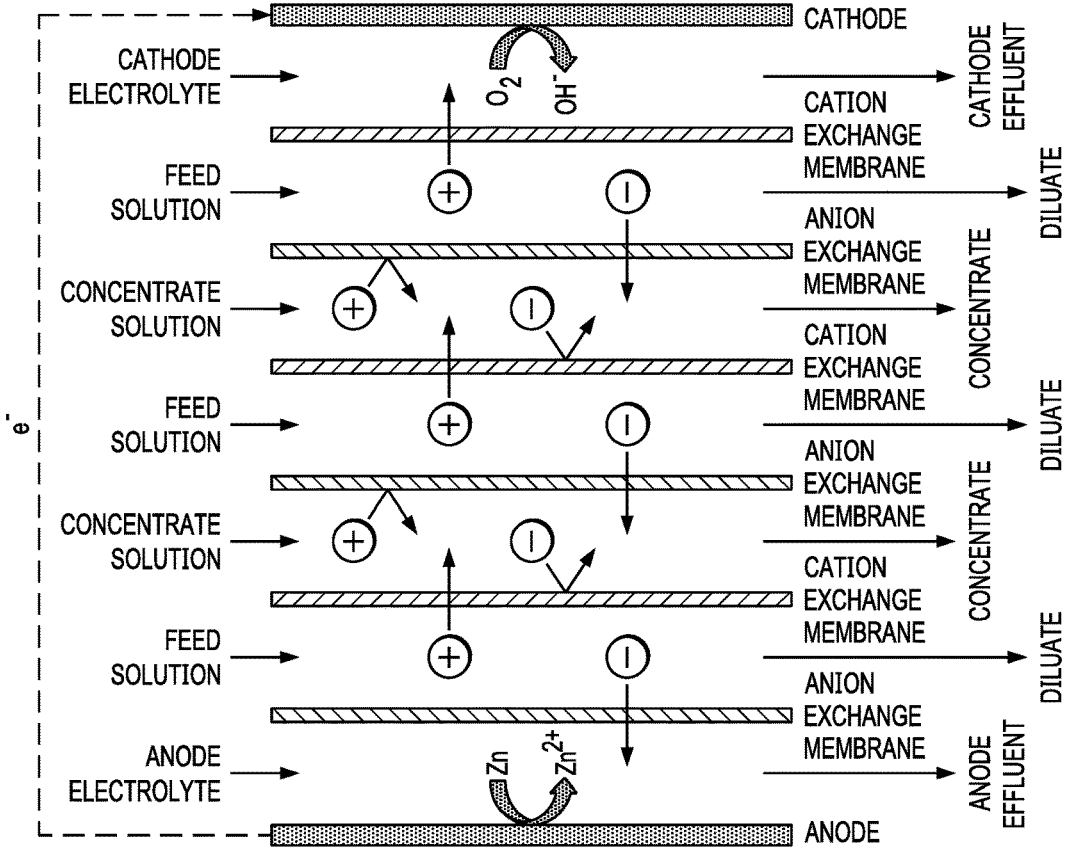
FIG. 26

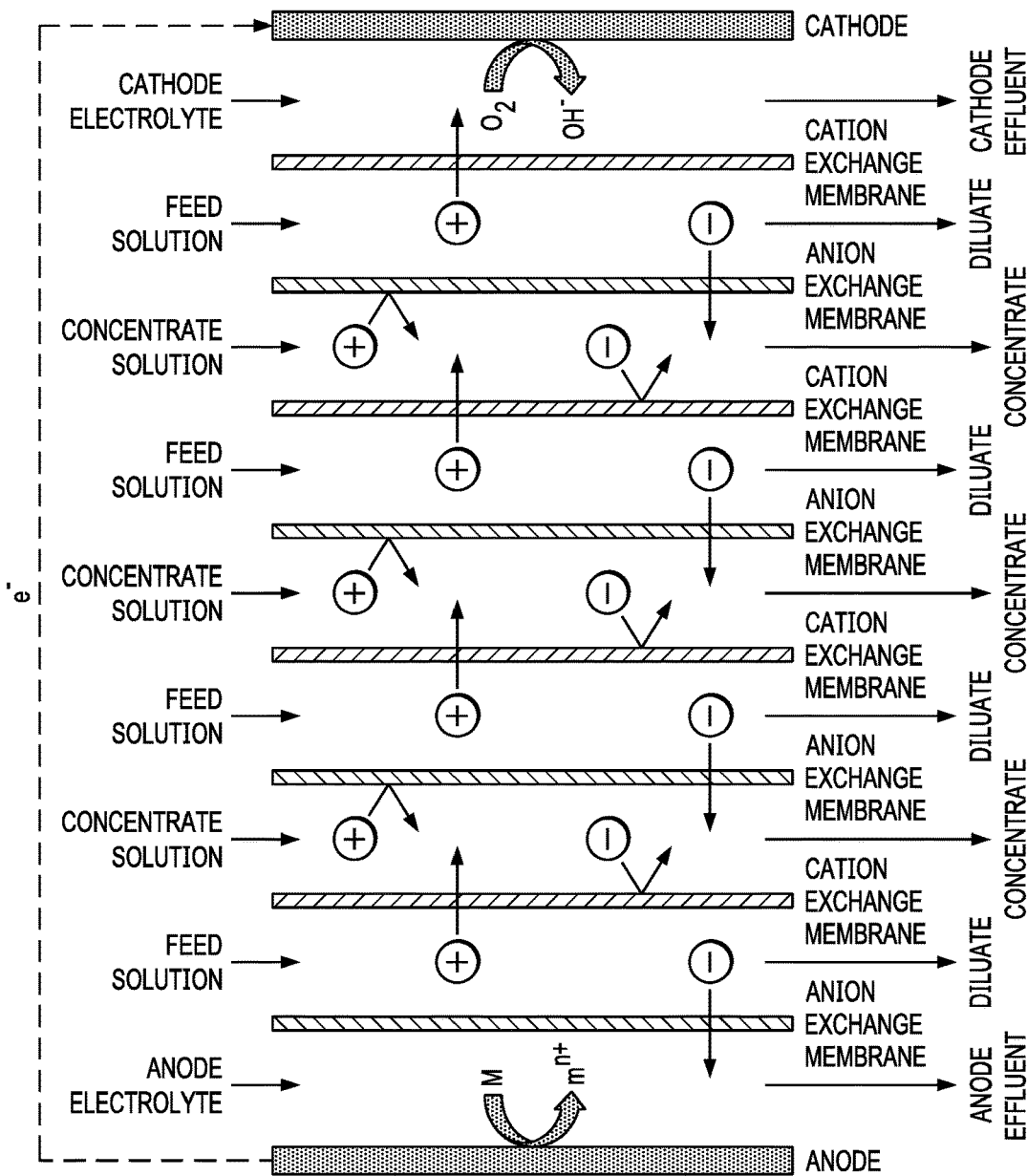
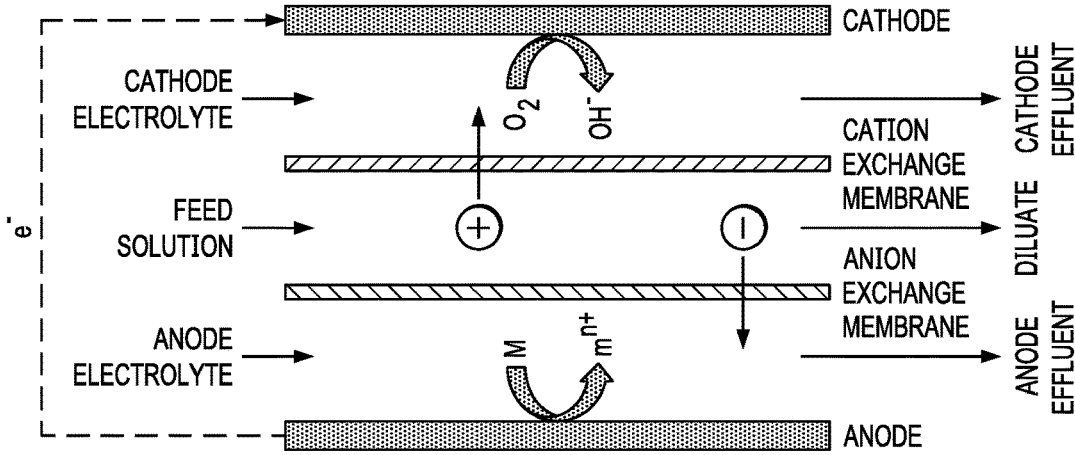
FIG. 27

INTEGRATED ENERGY GENERATION AND DESALINATION SYSTEM AND METHOD

STATEMENT OF FEDERALLY FUNDED RESEARCH

This invention was made with government support under Contract No. D15PC00122 awarded by the Defense Advanced Research Projects Agency. The government has certain rights in the invention.

CROSS-REFERENCE TO RELATED APPLICATIONS

None.

TECHNICAL FIELD OF THE INVENTION

The present invention relates in general to the fields of desalination and power generation.

BACKGROUND OF THE INVENTION

Without limiting the scope of the invention, its background is described in connection with simultaneous desalination and power generation using a single system or method.

Desalination, deionization, and related processes for removing ions from solutions are widely used in a variety of applications including drinking water production, wastewater treatment, food and beverage, and pharmaceuticals. Prior art desalination processes are inefficient and energy intensive especially for feed waters such as seawater that contain high concentrations of salts. Performing desalination at small scales is often impractical due to the high energy costs and difficulty in scaling down components.

Many prior art desalination technologies can be reversed to produce power by exploiting the salinity gradient from two solutions such as seawater and river water. Examples include pressure-retarded osmosis and reverse electrodialysis. Power production using these methods relies on the reversal of desalination, i.e., the addition of ions from a concentrated solution into a more diluted solution. These approaches are typically used as stand-alone power generation systems, not as part of a desalination process.

In some prior art approaches, such as capacitive deionization and intercalation-based "desalination batteries," power generation can be coupled to the desalination process. FIGS. 1A and 1B illustrate the desalination/charge and brine/discharge cycles, respectively, for a prior art capacitive deionization system. During capacitive deionization, an external power supply 102 is applied to two electrodes 105a, 105b and ions 110 in the feed water 115 are stored at the surface of the electrodes similar to charge storage in a capacitor. FIG. 1B also shows a load 120, e.g., a light bulb, being powered by the capacitive deionization system during the brine/discharge cycle. In the capacitative deioinization method, there is no charge transfer between the electrode and the solution. The electrochemical reactions are non-Faradaic. Ions are stored at the electrode-solution interface. It is a two-cycle process. In the first cycle, an external source of electrical power is needed to drive the charging of the electrodes, allowing dissolved ions to be retained. In the second cycle, a switching mechanism reverses cell polarity, leading to the release of ions back into solution.

FIGS. 2A and 2B illustrate the desalination/charge and brine/discharge cycles, respectively, for the prior art intercalation-based system. An intercalation-based desalination battery 200 is similar but relies on storage of the ions 210 in the electrodes 205a, 205b through intercalation-based mechanisms instead of capacitive charge storage. FIGS. 2A and 2B show feed water 215. FIG. 2A also shows a power supply 202 and FIG. 2B shows a load 220. In both cases, power generation and desalination processes in these approaches are interdependent but not concurrent. An external power source is required to drive the desalination process during a charge cycle. After desalination is complete, the process can be reversed to produce power and a brine concentrate during a discharge cycle. However, the power produced during the discharge cycle is always less than external power input during the charge cycle due to efficiency losses. Power production in these prior art processes is best thought of as an energy recovery process since it can minimize, but not replace, the need for external power.

The method requires reversible charge transfer oxidation reduction (redox) reactions between the electrode materials and chemical species in solution. Below is an example of reversible redox reactions used by the intercalation desalination method.

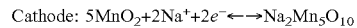

Cathode: $5MnO_2 + 2Na^+ + 2e^- \leftrightarrow Na_2Mn_5O_{10}$

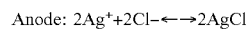

Anode: $2Ag^+ + 2Cl^- \leftrightarrow 2AgCl$

During the desalination/charge cycle, the cathode is used to capture cations from solution. During the desalination/charge cycle the anode is used to capture anions from solution, by virtue of AgCl being insoluble. For the process to be viable, both forward and reverse redox reactions are selected for fast charging and discharging, allowing the process to occur in a practical time frame (i.e., the electrochemical reactions are reversible). If one of the charge transfer reactions occurred at a slow rate it would be designated as an "irreversible" reaction, in which case the intercalation would not be a viable method for performing both water desalination and generating electrical power. Also the intercalaction method uses electrodes that are dimensionally stable, meaning that the electrodes maintain their size and shape, with no degradation or loss of electrode material over multiple charge and discharge cycles (i.e., the electrodes do not undergo any overall chemical transformations other than to cycle between oxidation and reduction states). A feature of this method is that desalination of brine occurs alternately to power generation. The two processes are not co-incident. During the desalination/charge stage the method requires a source of electrical power to be connected between the anode and cathode, such as connection to an external grid, primary battery, secondary battery or solar panel etc., with switching mechanisms to disconnect the external power source during the discharge phase.

Table 1 presents a comparison of prior art desalination technologies:

| Technology | Typical Application | Desalination Energy Consumption |
| --- | --- | --- |
| Membrane Processes | | |
| Reverse Osmosis | Seawater and brackish desalination | 3-5 W-h/L - large scale |
| Electrodialysis | Brackish desalination | ~2 W-h/L - brackish |
| | | ~20 W-h/L - seawater |
| Other Processes | | |
| Capacitive Deionization | Seawater and brackish desalination, wastewater recovery | 0.05-0.1 W-h/L - brackish |
| | | 4-9 W-h/L - seawater |
| Electrodeionization | Ultrapure water production, polishing step for RO | N/A |
| Distillation | Seawater desalination | 7-85 W-h/L - large scale |

The most widely used desalination technologies are reverse osmosis (RO) and thermal processes using distillation or evaporation. Reverse osmosis mechanically pressurizes salt-containing feed waters and forces salt-free water through a semi-permeable membrane. Reverse osmosis is currently the most energy efficient process, consuming about 5 watt-hours/liter (W-h/L) for large scale seawater desalination systems. This corresponds to an overall energy efficiency of only about 20%, considering that the theoretical minimum energy to desalinate seawater is 1.08 W-h/L. Other desalination technologies, including distillation, electrodialysis, and capacitive deionization, all have comparable or worse energy efficiencies than reverse osmosis. Furthermore, many of these processes are difficult to scale down effectively due to limitations in miniaturizing components, such as high pressure pumps that are typically used in reverse osmosis systems.

Electrodialysis (ED) is a membrane desalination process which uses electric current to selectively remove ions from the feed water. FIG. 3 shows a schematic of a typical prior art electrodialysis unit 300. The main component of the unit is an electrodialysis stack 302 that includes two electrodes 305a, 305b (anode 305a and cathode 305b) separated by alternating anion-selective membranes 310a and cation-selective membranes 310b (ion selective membranes 310a, 310b) which form flow channels 315 for the inlet seawater. When a direct current (DC) potential from, e.g., a DC power supply 320, is applied to the electrodes 305a, 305b, positively charged ions 325 are attracted to the negatively charged electrode, the cathode 305b, while the negatively charged ions 330 are attracted to the positively charged electrode, the anode, 305a. This attraction causes the ions to migrate through the anion-selective membranes 310a and cation-selective membranes 310b, leading to formation of alternating desalinated (diluate) streams 335a, and ion concentrated (concentrate) streams 335b. Current is sustained in the electrodialysis stack 302 at the electrodes 305a, 305b through water splitting reactions that lead to the production of either $O_2$ gas 340 or $Cl_2$ gas (not shown) at anode 305a and $H_2$ gas 344 at the cathode 305b. Also shown are anode electrolyte 332a and cathode electrolyte 332b, feed solution streams 340a and concentrate solution streams 340b, and anode effluent 345a and cathode effluent 345b. A typical industrial electrodialysis stack 302 includes 100 or more pairs of ion-selective membranes 310a, 310b between the electrodes 305a, 305b to increase the desalination rate. The degree of desalination that can be achieved in a single pass of the feed solution into the electrodialysis stack 302 is a function of the solution concentration, residence time in the electrodialysis stack 302, and the applied current. Electrodialysis is a mature technology that has seen use for over 50 years but is primarily used for the desalination of brackish waters, which are waters containing less than about 10,000 mg/L of total dissolved solids. This is due to energy consumption and large membrane area required to desalinate waters with high concentration of dissolved solids.

Another prior art example is the hybrid flow battery, able to desalinate and supply electrical energy as in FIG. 4. The method uses two stages (1) discharge desalination 400 and salination charging 420. Brine 401 is fed to an electrolyte compartment 402. Operation causes removal of NaCl from the electrolyte central compartment 401. The zinc anode 403 is oxidized to form $Zn^{2+}$ ions drawing $Cl^-$ ions into the electrolyte 404 in the anode compartment 405 through an anion exchange membrane 406. The electrolyte 407 in the cathode compartment 408 contains dissolved $K_3Fe(CN)_6$. While ferricyanide is reduced to ferrocyanide 409 in the electrolyte at the cathode 410 drawing $Na^+$ ions into the cathode compartment through a cation exchange membrane 411. A diluate is formed in the central compartment 402 which may be discharged 412. Spent electrolytes are discharged 413. During the discharge cycle electrons flow from anode to cathode 414. The electrodes are in electrical connection 415 to an external source of electrical energy 416. The discharge cycle alternates with the charge cycle 420, where a new volume of brine 421, enters the central compartment 402 where $Na^+$ and $Cl^-$ are driven into the central compartment 402, forming a concentrate which is discharged 422. Reduction of $Zn^{2+}$ ions occurs at the anode 423. Oxidation of ferrocyanide occurs at the cathode 424. Example of reversible electrochemical reactions used in the hybrid method:

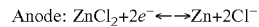
Anode: $ZnCl_2 + 2e^- \leftrightarrow Zn + 2Cl^-$

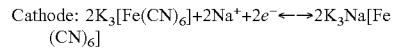
Cathode: $2K_3[Fe(CN)_6] + 2Na^+ + 2e^- \leftrightarrow 2K_3Na[Fe(CN)_6]$ The discharge cycle arises due to reversal of the anode and cathode electrochemical reactions, requiring a source of electrical power to be connected between the anode and cathode such as connection to an externally located electrical grid, primary battery, secondary battery or solar panel etc. Switching mechanisms are needed to disconnect the external power source during the discharge phase. The method requires reversal of polarity and separates desalination and electrical energy generation in time. Therefore, desalination and electrical energy production are not coincidental. The need for reversible redox reactions is emphasized. If one of the charge transfer reactions occurred at a slow rate it would be designated as an "irreversible" reaction, in which case the intercalation would not be a viable method for performing both water desalination and generating electrical power. Also, the hybrid flow battery method requires electrodes that are dimensionally stable, meaning that the electrodes maintain their size and shape, with no degradation or loss of electrode material over multiple charge and discharge cycles. The electrodes do not undergo any overall chemical transformations other than to cycle between oxidation and reduction states, associated with reversible electron transfer reactions at the electrode solution interface. In some instances, the method is designed to operate by bulk electrode material being dissolved from the electrode solution interface during discharge, then redeposited during the charging phase. The overall change in electrode mass is zero or near zero, with no significant transfer of solid electrode material into solution. A disadvantage of this approach is that spent electrodes and/or electrolytes must be stored and recycled during salination mode recharging. The storage of spent electrodes/electrolytes can lead to systems which are too heavy and bulky for portable applications.

The aforementioned prior art for carrying out desalination coupled with electrical energy generation is practiced using reversible redox reactions. These are oxidation and reduction (redox) reactions, where the redox agents serve the double function of accepting electrons from an electrode and donation of electrons to the electrode. Transfer of electrons between an electrode and an electron acceptor/donor redox agent occurs at the electrode solution interface. The prior art discloses specific compositions of electrolytes containing redox agents. Examples include but are not limited to: $[Fe(CN)_6]^{3-}/[Fe(CN)_6]^{4-}$, $Ce^{4+}/Ce^{3+}$, $Fe^{2+}/Fe^{3+}$. Preparation of these liquid electrolytes is a step in practicing prior art methods. Placement of these electrolyte compositions adjacent to anode or cathode electrode solution-interface is also a step in practicing the prior art desalination/electrical energy generation process. The liquid electrolytes containing redox agents have a distinct chemical composition from the feed water entering the cell, feed water including, e.g., sea water, brine, brackish water, etc. Within the prior art desalination apparatus, there are compartments predominantly served with feed water. These compartments are distinct from compartments that are served predominantly with the redox agent electrolyte.

Despite these advances, a need remains for novel methods and devices for small scale desalination that consume reduced amounts of energy in comparison to the prior art. What is needed is an integrated energy generation and desalination process that reduces the energy consumption and simplifies system design, particularly for small scale applications. It would be desirable to have methods of desalination that operate uncoupled from an external source of electrical power, such as an electrical grid, diesel generator, solar panels, wind generators or chemical storage batteries. An independently operating desalination device would be beneficial for use in remote areas and in locations with limited technology resources or limited electrical power infrastructure. For example, this type of device would be useful for providing drinking water during natural disasters, for travel in unpopulated regions, in areas affected by military conflict, during treking/hiking expeditions, and aboard river craft or sea craft. The current invention addresses this needed.

SUMMARY OF THE INVENTION

In one embodiment, the present invention includes a method for integrated energy generation and desalination including: providing an anode and a cathode; providing a desalination device operably coupled to establish an electrical potential between the anode and the cathode when the desalination device is operating; providing water containing dissolved solids, thereby establishing the electrical potential between the anode and the cathode; reducing a salinity of the water by supplying the water to the desalination device; and generating electrical power by reducing the salinity of the water. In one aspect, the anode includes metal and the cathode is an air cathode. In another aspect, the metal includes magnesium, aluminum, or zinc, or some combination thereof. In another aspect, the metal includes Mg alloys selected from AZ31, AZ61, and AZ91 that contain 3%, 6%, and 9% aluminum, respectively. In another aspect, the metal is coated with bismuth, tin, or mercury. In another aspect, the desalination device is an electrodialysis device, an electrodeionization device, or an ion concentration polarization device. In another aspect, the integrated energy generation and desalination method can operation in at least one of a reversible chemistry or a non-reversible chemistry. In another aspect, the anode is at least partially surrounded by a filter to trap sludge. In another aspect, the anode is removable or replaceable. In another aspect, an anode electrolyte is divided into a first and a second flow field by a porous separator situated parallel to the anode, wherein a first flow field is a relatively low-velocity flow field adjacent to the anode, and a second flow field is a relatively high-velocity flow field. In another aspect, the method further includes electrodepositing anode material by reducing the salinity of the water.

In another embodiment, the present invention includes a method for integrated energy generation and desalination including: providing a volume of water containing dissolved solids; providing an anode and a cathode in fluid communication with the volume of water, wherein the anode and the cathode are operable to be connected to an electrical load located outside the volume of water; filling at least a portion of a space between the anode and the cathode with at least a portion of the volume of water; forming positive ions at an anode surface and forming negative ions at a cathode electrode, thereby establishing an electrical potential between the anode and the cathode; and removing at least a portion of the dissolved solids from the volume of water. In one aspect, the forming positive ions at the anode surface includes the fluid communication of an electrolyte and the anode surface. In another aspect, the forming negative ions at a cathode surface includes establishing fluid communication between oxygen and the cathode surface. In another aspect, at least one ion exchange membrane includes a pair of ion exchange membranes, the pair of ion exchange membranes including an anion exchange membrane and a cation exchange membrane. In another aspect, the anode includes metal and the cathode is an air cathode. In another aspect, the metal includes magnesium, aluminum, zinc, mercury, bismuth, tin, or some combination thereof. In another aspect, the metal includes Mg alloys selected from AZ31, AZ61, and AZ91 that contain 3%, 6%, and 9% aluminum, respectively. In another aspect, the metal is coated with bismuth, tin, or mercury. In another aspect, the removing at least a portion of the dissolved solids from the volume of water includes using an electrodialysis device, an electrodeionization device, or an ion concentration polarization device. In another aspect, the integrated energy generation and desalination method can operation in at least one of a reversible chemistry or a non-reversible chemistry. In another aspect, the anode is at least partially surrounded by a filter to trap sludge. In another aspect, the anode is removable or replaceable. In another aspect, an anode electrolyte is divided into a first and a second flow field by a porous separator situated parallel to the anode, wherein a first flow field is a relatively low-velocity flow field adjacent to the anode, and a second flow field is a relatively high-velocity flow field. In another aspect, the method further includes electrodepositing anode material by reducing the salinity of the water.

In another embodiment, the present invention includes a system for integrated energy generation and desalination including: an electrical battery including an anode and a cathode; and a device for electrically-driven desalination coupled to the anode and the cathode to establish an electrical potential between the anode and the cathode when the device for electrically-driven desalination is operating. In one aspect, the electrical battery includes a metal-air battery. In another aspect, the metal includes Mg alloys selected from AZ31, AZ61, and AZ91 that contain 3%, 6%, and 9% aluminum, respectively. In another aspect, the metal is coated with bismuth, tin, or mercury. In another aspect, the device for electrically-driven desalination includes an electrodialysis device. In another aspect, the integrated energy generation and desalination method can operation in at least one of a reversible chemistry or a non-reversible chemistry. In another aspect, the anode is at least partially surrounded by a filter to trap sludge. In another aspect, the anode is removable or replaceable. In another aspect, an anode electrolyte is divided into a first and a second flow field by a porous separator situated parallel to the anode, wherein a first flow field is a relatively low-velocity flow field adjacent to the anode, and a second flow field is a relatively high-velocity flow field. In another aspect, the system is configurable for electrodepositing anode material by desalination.

In another embodiment, the present invention includes a system for integrated energy generation and desalination including: an anode operable to be placed in fluid communication with an anode electrolyte; a cathode operable to be placed in fluid communication with a cathode electrolyte and an oxygen supply; one or more electrical conductors electrically connecting the anode and the electrical load to the cathode; and at least one pair of ion exchange membranes including an anion exchange membrane and a cation exchange membrane positioned adjacent to each other, wherein the at least one pair of ion exchange membranes are positioned in a space between the anode and the cathode with each anion exchange membrane positioned nearer the anode and each cation exchange membrane positioned nearer the cathode, and wherein at least one space between the anion exchange membrane and the cation exchange membrane of each pair of ion exchange membranes is configured to receive a volume of water containing dissolved solids. In one aspect, the anode includes magnesium, aluminum, zinc, mercury, bismuth, tin, or some combination thereof. In one aspect, the anode includes Mg alloys selected from AZ31, AZ61, and AZ91 that contain 3%, 6%, and 9% aluminum, respectively. In another aspect, the anode is coated with bismuth, tin, or mercury. In another aspect, the anode is placed in fluid communication with the anode electrolyte. In another aspect, the cathode is placed in fluid communication with the cathode electrolyte and the oxygen supply. In another aspect, the integrated energy generation and desalination method can operation in at least one of a reversible chemistry or a non-reversible chemistry. In another aspect, the anode is at least partially surrounded by a filter to trap sludge. In another aspect, the anode is removable or replaceable. In another aspect, an anode electrolyte is divided into a first and a second flow field by a porous separator situated parallel to the anode, wherein a first flow field is a relatively low-velocity flow field adjacent to the anode, and a second flow field is a relatively high-velocity flow field. In another aspect, the system is configurable for electrodepositing anode material by desalination.

In another embodiment, the present invention includes a method for integrated energy generation and desalination including: providing an anode and a cathode; providing a desalination device operably coupled to establish an electrical potential between the anode and the cathode when the desalination device is operating; providing water containing dissolved solids, thereby establishing the electrical potential between the anode and the cathode; reducing a salinity of the water by supplying the water to the desalination device; generating electrical power; and switching between the step of reducing the salinity of the water and the step of generating electrical power to provide integrated energy generation and desalination. In one aspect, the integrated energy generation and desalination method can operation in at least one of a reversible chemistry (Zn-air) or a non-reversible chemistry.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which:

FIG. 6 shows the decreasing conductivity of the diluate solution over time due to desalination and the decreasing discharge current of the cell due to the increase in resistance of the diluate using the present invention.

FIGS. 15A and 15B show a single membrane pair metal-air desalination battery stack (FIG. 15A) and a four-membrane-pair metal-air desalination battery stack (FIG. 15B), respectively.

FIG. 18A shows inlet flow v. current, and FIG. 18B inlet flow rate v. outlet conductivity.

FIG. 19 depicts an overview of the potential balance of plant (BOP) for a metal-air desalination battery system of the present invention.

FIG. 20 shows a load connected in series between the anode and cathode.

FIG. 21 shows a hydrogen gas being fed into an external power source such as a fuel cell.

FIG. 22 shows metal-air battery cells that are placed fluidically in parallel to MADB desalination cells and either located directly in the MADB stack or as a separate stack.

FIG. 23 shows a photoelectrochemical reaction such as water splitting replacing one of the electrochemical half-cell reactions to provide a hybrid system.

FIG. 24 shows a hybrid electrochemical and capacitive cell where one of the half-cells is electrochemical and counter electrode uses capacitive storage of ions and charge.

FIG. 26 shows multiple membrane pair arrangement during the discharge of the metal air battery during desalination.

FIG. 27 shows an example of how the use of cells with multiple membrane pairs improves anode utilization, desalination rate, and current efficiency versus designs that use a single membrane pair.

DETAILED DESCRIPTION OF THE INVENTION

Figure 1B:
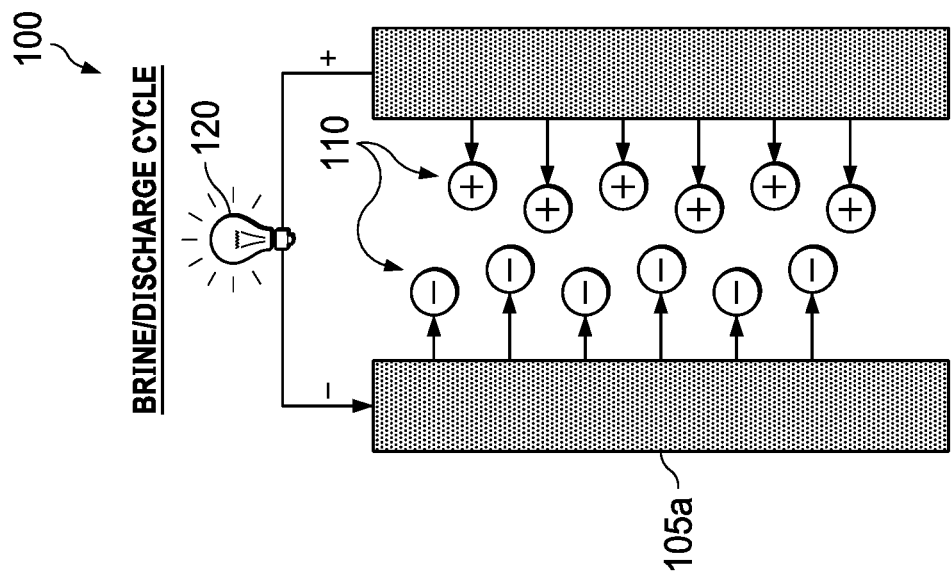
FIGS. 1A and 1B illustrate the desalination/charge cycle for a prior art capacitive deionization system and for a prior art capacitive deionization system, respectively.
Figure 1A:
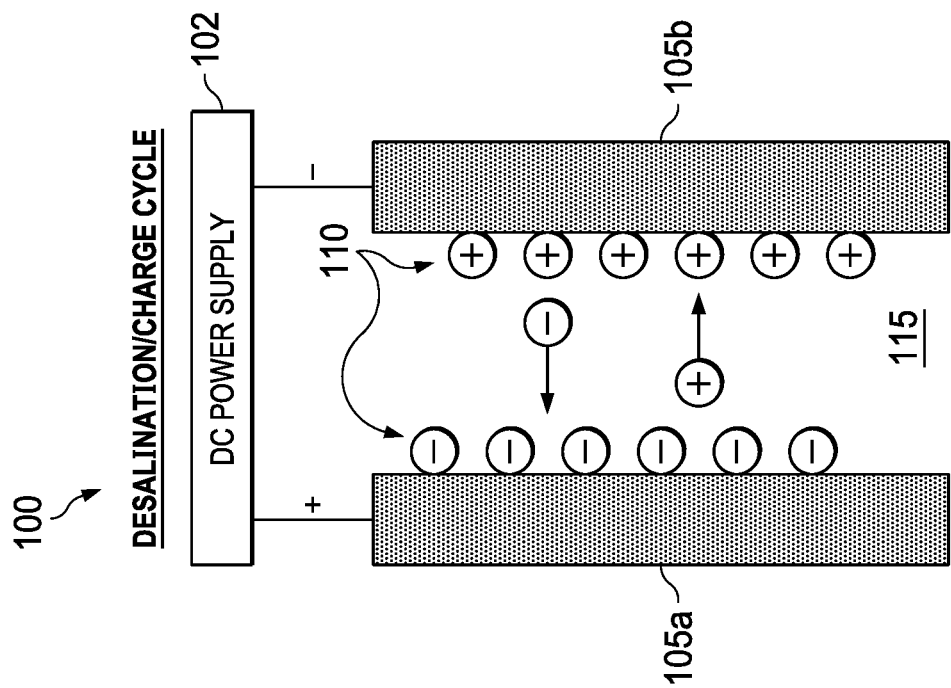
Figure 2B:
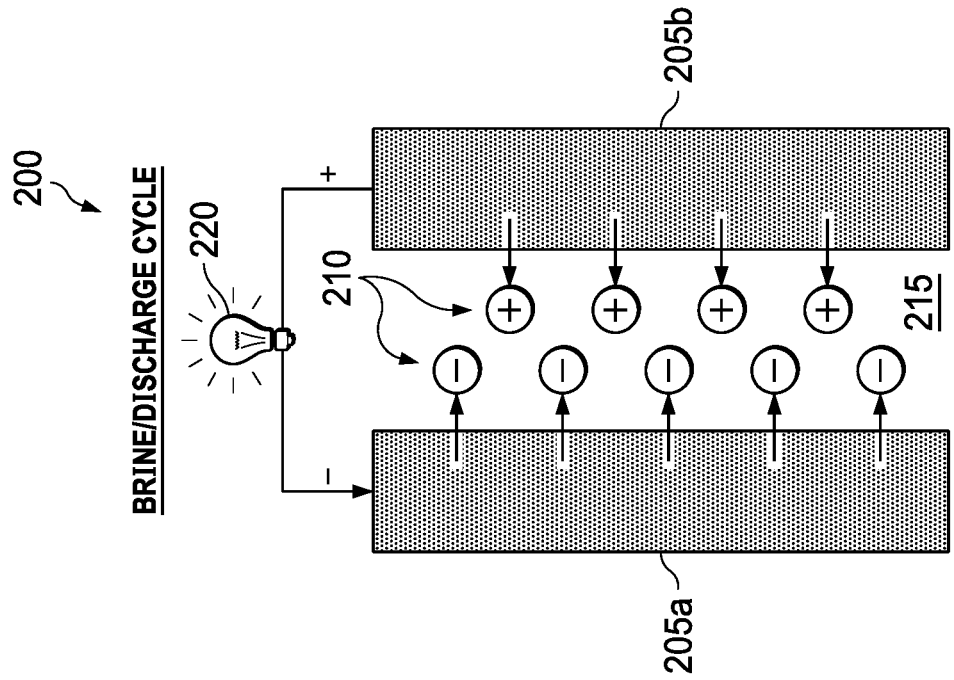
FIGS. 2A and 2B illustrate the desalination/charge cycle and the brine/discharge cycle, respectively, for a prior art intercalation-based system.
Figure 2A:
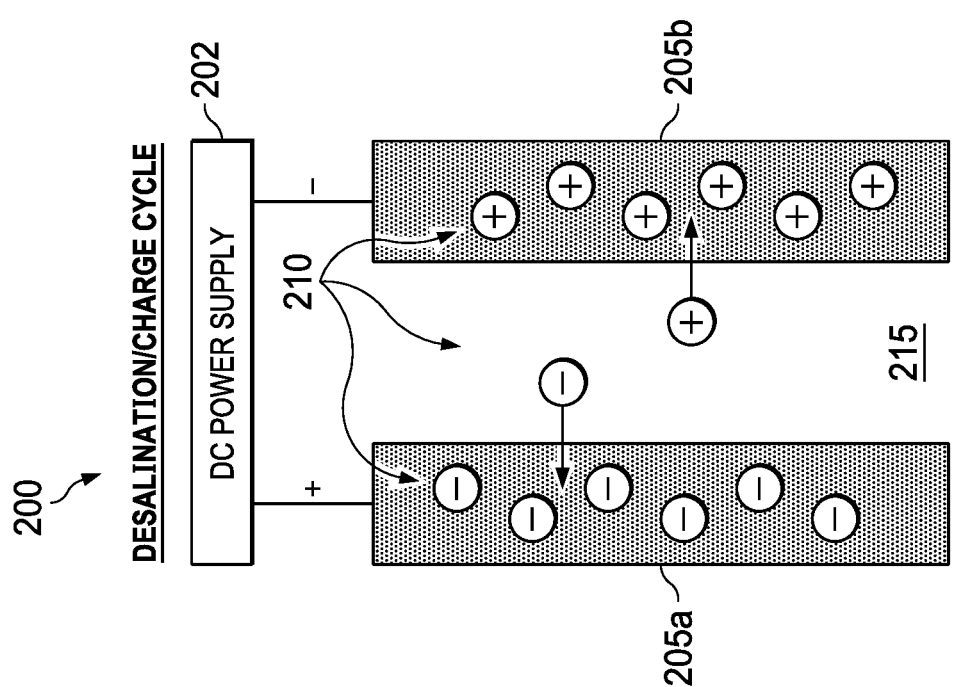

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention includes the integration of electrochemical energy generation and desalination into a single process. This is accomplished by combining an electrically driven desalination process such as electrodialysis with an electrochemical energy generation process such as metal-air batteries. A key element of this invention is that the energy and desalination processes are both coincident and interdependent such that energy generation cannot occur without desalination occurring. Conversely, desalination cannot occur without concomitant energy generation. The external power source required for current desalination approaches is eliminated by directly integrating the energy generation and desalination processes.

A key element of this invention is that the integrated energy generation process uses an electrochemical cell with at least one Faradaic redox reaction that produces a counter-ion for an ion targeted for removal. The use of redox reactions differentiates this invention from prior work on capacitive deionization which removes ions and stores charge in electrical double layers at the surface of electrodes. The production of a counter-ion differentiates this invention from prior work on desalination batteries which rely on the intercalation of ions such as $Na^+$ into the bulk of the electrode material for charge storage.

Numerous electrochemical cells are suitable for direct integration with desalination processes. A general requirement for suitable energy technologies is the ability to operate under conditions which the feed solution is in the liquid phase. For example solid oxide fuel cells, thermal batteries, and other high temperature cells are not suitable since feed solutions would be in the vapor phase. Another general requirement for suitable energy technologies is the generation of an electromotive force greater than the Nernst potential generated by the difference in ion concentration of the feed solution and the ion concentration in the product water that is desired. For example, the feed water contains 600 mM NaCl and the desired product water concentration is 10 mM which creates a Nernst potential of about 100 mV at 25° C. Using this example, only electrochemical cells which can generate potentials greater than about 100 mV can be used to achieve the desired level of desalination.

An electrochemical cell by definition includes two half-cell reactions involving a reactant and an oxidant. These half-cell reactions can be irreversible (e.g., primary batteries) or reversible (e.g., rechargeable batteries). There are a great number of suitable reactants and oxidants that can be used. Reactants which can be used at the anode include but are not limited to gases such as hydrogen and methane, liquids such as sodium borohydride and alcohols, solids such as iron and lithium, and ionic solutions such as those containing divalent vanadium species. Oxidants which can be used at the cathode include but are not limited to gases such as air and oxygen, liquids such as water and hydrogen peroxide, solids such as silver chloride and copper chloride, and ionic solution such as those that contain pentavalent vanadium species. Any combination of reactant and oxidant can be used which encompasses electrochemical cells referred to as batteries, fuel cells, redox flow batteries, etc. The reactant and oxidant may be stored in the cell as in a battery or stored external to the cell as in a fuel cell or flow battery. Alternatively, the reactant may be stored in the cell whereas the oxidant is stored external to the cell as in a metal-air battery.

A number of different desalination technologies can be integrated with power generation into a single process. A general requirement for a suitable desalination technology is that it must be an electrically driven process. For example, desalination technologies which rely on mechanical energy such as pressure with reverse osmosis or thermal energy with distillation are unsuitable. Suitable desalination technologies that are electrically driven include but are not limited to electrodialysis, electrodeionization, and ion concentration polarization.

Another general requirement for the desalination process is the use of membranes for separation of the ions. Suitable membranes for ion separation are semi-permeable and most commonly ion exchange membranes although other types of semi-permeable membranes such as ultrafiltration and nanofiltration membranes can be used.

An embodiment of the present invention is the integration of metal-air batteries with electrodialysis, henceforth referred to as a metal-air desalination battery (MADB). Metal-air battery chemistries feature high energy density, low cost, low toxicity, and ability to work with aqueous solutions at neutral and near-neutral pH including many natural waters such as brackish water and seawater.

Figure 3:
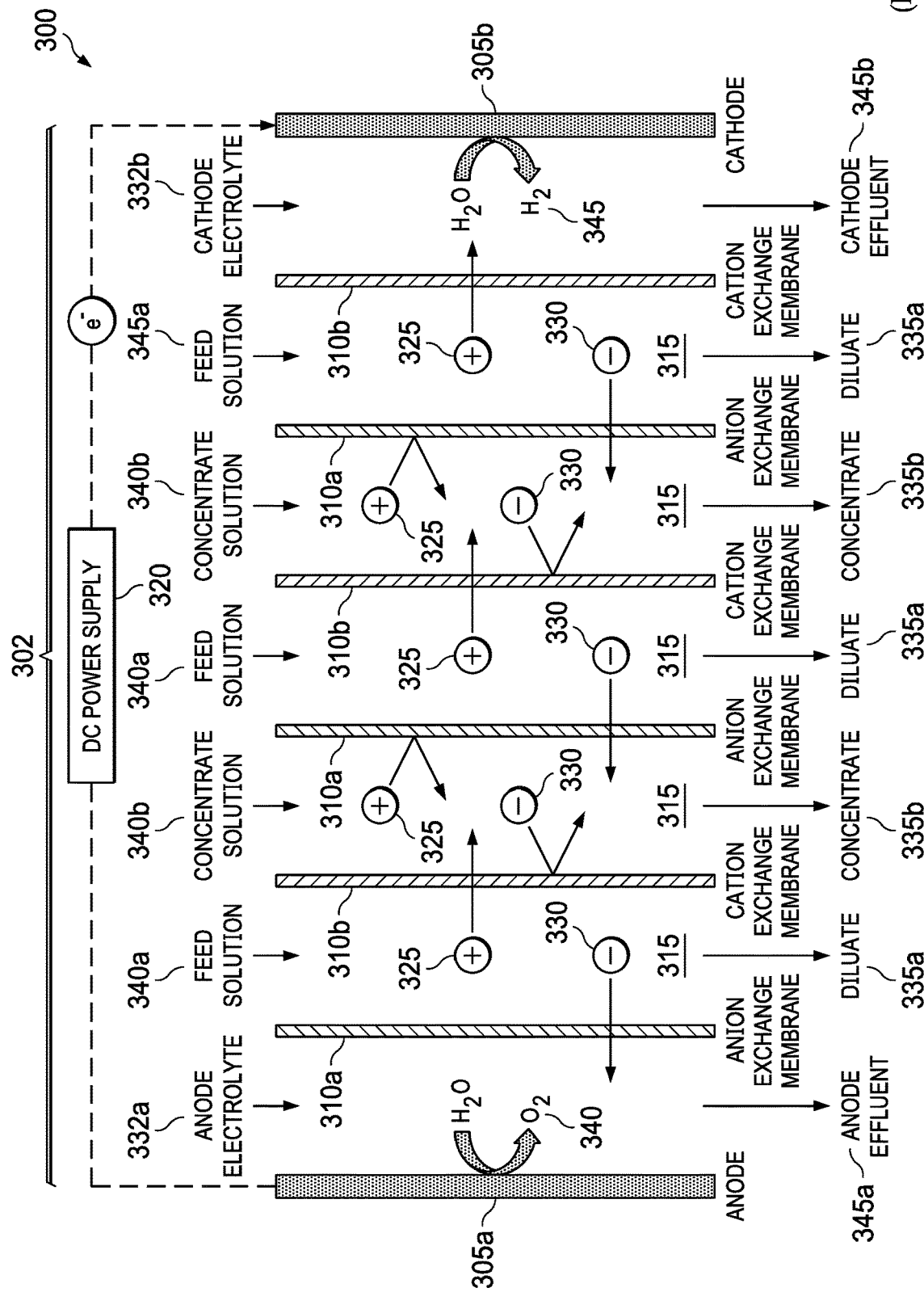
FIG. 3 shows a schematic of a typical prior art electrodialysis unit.
Figure 4:
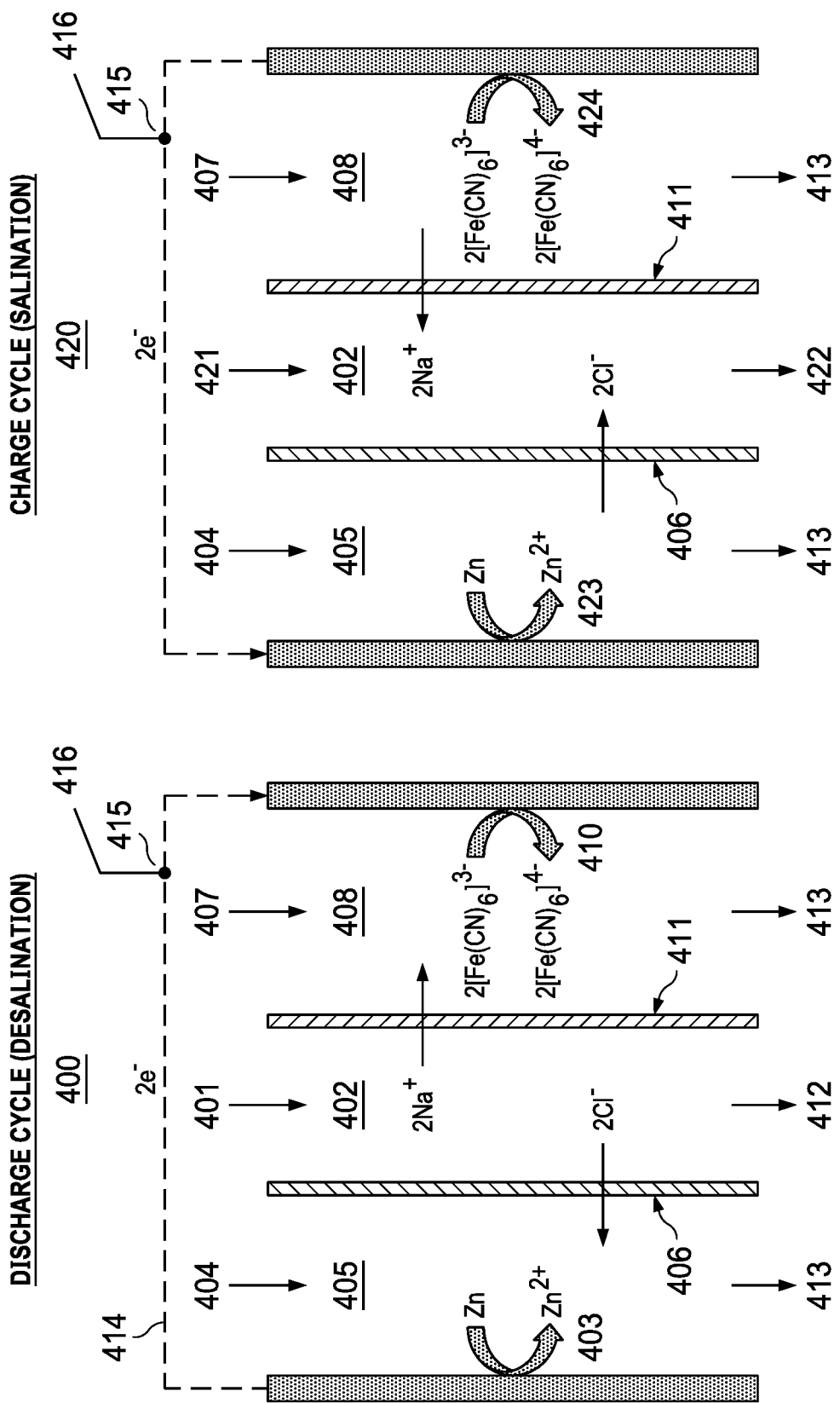
FIG. 4 is a schematic of a typical prior art hybrid flow battery desalination unit.
Figure 5:
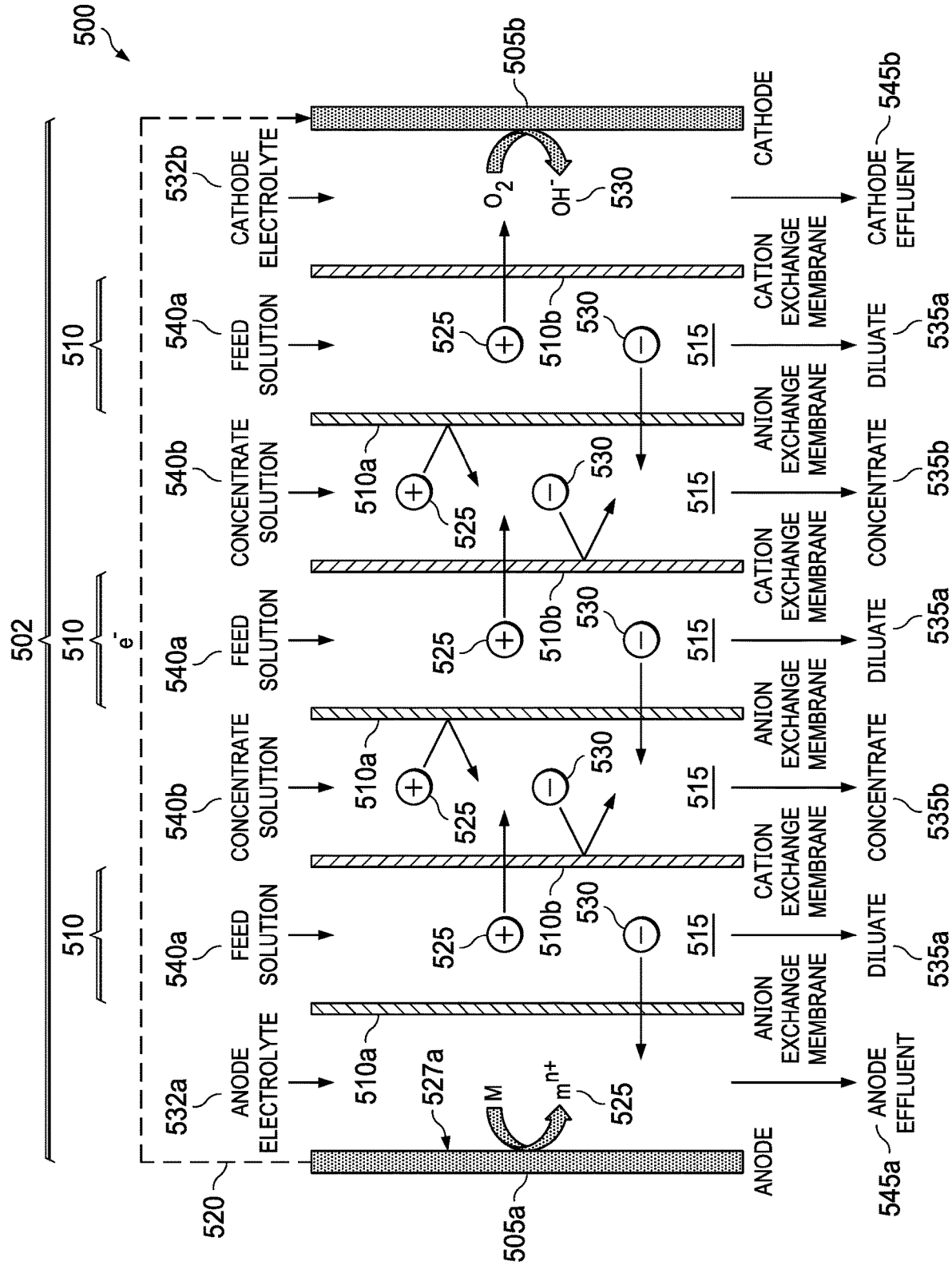
FIG. 5 shows a metal-air desalination battery of the present invention.

FIG. 5 shows an embodiment of the present invention, a metal-air desalination battery 500. This metal-air desalination battery 500 includes an electrodialysis stack 502 that includes one or more pairs 510 of alternating anion exchange membranes (AEM) 510a and cation exchange membranes (CEM) 510b (ion exchange membranes 510a, 510b). These one or more pairs 510 form flow channels 515 and include the electrodialysis component are bounded by a metal anode 505a and an air cathode 505b that include the metal-air battery component. Prior art electrodialysis uses pairs of AEMs and CEMs to selectively move ions into separate compartments under an applied electric potential, as shown in FIG. 3. In the present invention, however, a different source of energy is used to drive the electrodialysis, and the nature of the electrochemical reactions that occur in the electrodialysis electrodes is different. Prior art electrodialysis is powered by an external power supply and the electrode reactions involve the splitting of water through electrolysis to produce H₂ and O₂ gas along with NaOH and HCl, respectively. In contrast, the present invention integrates the power source into the electrodialysis stack 502 and replaces the electrolysis reactions at the electrodes 505a, 505b (anode 505a and cathode 505b) with metal-air battery reactions, producing harmless metal salts.

The metal-air desalination battery 500 works because of reactions at the electrodes 505a, 505b. There are two electrodes 505a, 505b connected via an external electrical circuit 520. The electrodes 505a, 505b initially are uncharged, each electrode 505a, 505b having equal numbers of positive and negative charges. When the anode 505a is contacted with an anode electrolyte 532a, positive metal ions 525 are formed at the anode electrode surface 527a. These positive ions 525 pass into solution, making the anode 505a progressively more negative. The positive metal ions 525 in solution tend migrate away from the anode electrode surface 527a. The anode 505a becomes attractive to negative ions 530 in the electrolyte. The process is caused by the electrochemical reactivity of the metal anode 505a when it is in contact with the electrolyte 527a. There is no input of electrical current from an external source.

At the other electrode, the cathode 505b, oxygen from air 532 reacts to form negative hydroxyl ions 530 in the cathode electrolyte 532b. The negative ions 530 move away, attracted towards the anode 505a. A voltage difference is established between the electrodes 505a, 505b. Electrons are released from the anode 505a and migrate to the cathode 505b via the external electrical circuit 520. The attraction of positive ions 525 to the anode 505a and of the negative ions 530 to the cathode 505b causes the ions 525, 530 to migrate through the AEMs 510a and the CEMs 510b, leading to the formation of diluate streams 535a and concentrate streams 535b. Also shown are feed solution streams 540a, concentrate solution streams 540b, anode effluent stream 545a, and cathode effluent stream 545b.

An example of the set of reactions for a metal-air desalination battery 500 using a Mg anode 505b and NaCl feed solution streams 540a is as follows:

Anode: $2Mg \rightarrow 2Mg^{2+} + 4e^-$ and $2Mg^{2+} + 4Cl^- \rightarrow 2MgCl_2$ Cathode: $O_2 + 2H_2O + 4e^- \rightarrow 4OH^-$ and $4OH^- + 4Na^+ \rightarrow 4NaOH$ Overall: $2Mg + O_2 + 2H_2O + 4NaCl \rightarrow 2MgCl_2 + 4NaOH$ As described herein, the present invention includes a system and a method to achieve desalination within the physical embodiment of a metal-air battery cell, exploiting the operating principles of a metal-air battery. Metal-air batteries can be established using a variety of anode and cathode processes. The present invention is not restricted to any one particular combination or variety of metal-air batteries such as the example illustrated in FIG. 5.

Irreversible electrochemical reactions are featured in the invention. For example, the oxidation of magnesium ($2Mg \rightarrow Mg^{2+} + 2e^-$) cannot be reversed. To be exact, when the cell potential is reversed, the deposition of magnesium ($Mg^{2+} + 2e^- \rightarrow 2Mg$) occurs at such an extremely slow rate so as to be deemed entirely irreversible. Similar, the oxidation of aluminum at the anode ($2Al \rightarrow Al^{2+} + 2e^-$) cannot be reversed. To be exact, the deposition of magnesium ($Al^{2+} + 2e^- \rightarrow 2Al$) occurs at such an extremely slow rate so as to be deemed entirely irreversible.

During operation, the feed solution is a source of water containing dissolved salts, such as brine, seawater, brackish water, well water etc. Likewise, the electrolyte solution serving the anode compartment is from the feed solution, and has the same chemical composition as the feed solution. Likewise, the electrolyte solution serving the cathode compartment is from the feed solution, having the same chemical composition as the feed solution. Therefore, all solutions serving the compartments of the invention are from the same feed water source, and have identical chemical composition to the feed water source. The step of preparing specific electrolytes containing redox agents is not required. The step of placing electrolytes containing redox agents adjacent to the electrodes is not required.

A feature of the invention is that the production of useable energy occurs coincidentally with the process of desalination, a distinction from prior art. Additionally, the present invention produces energy and performs desalination without use of alternating charge/discharge cycles, where cell polarity is reversed. Reversal of the direction of current flow between anode and cathode is not a feature of the present invention. Another feature of the invention is that anodes composed of magnesium, aluminum or zinc, are intentionally used in a way that they are dissolved into the surrounding electrolyte, due to $Mg^{2+}$ $Al^{2+}$ or $Zn^{2+}$ ion release at the electrode-solution interface. The loss of material occurs continuously as desalination occurs, leading to a substantial reduction in anode mass over time. As the process continues, the amount of magnesium, aluminum or zinc anode material can entirely deplete, causing desalination to cease. This situation can be addressed, for example, by installing a replacement anode, of the original mass and dimensions, into the cell compartment allowing desalination and electrical power output to resume. Finally, the present invention includes electrochemical cell configurations and electrode processes, where the electrochemical reactions are irreversible.

The process of the metal-air desalination battery 500 may be summarized as the oxidation of a metal anode by oxygen at the cathode. The metal-air desalination battery 500 is also characterized by ionic flux in the electrolyte separating the electrodes.

The power output from the metal-air desalination battery 500 is given by the charge passing per unit time (amps) multiplied by the energy per charge (volts): power (joules/sec)=volts (joules/coulomb)×amps (coulombs/sec).

A test cell with an active area of 50 cm$^2$ was fabricated using 0.159 cm (1/16-inch) thick Mg AZ31 plate as an anode and E-4 air cathode from Electric Fuel Limited. The air cathode of this example is categorized as a gas diffusion electrode. The base material of a gas diffusion electrode is a high surface area particulate carbon, formed as a gas diffusion layer by treatment with polytetraflouroethylene (PTFE) to become hydrophobic. This hydrophobic carbon layer prevents electrolyte leakage while allowing oxygen diffusion into the electrode structure from ambient air. Adjacent to the gas diffusion layer, there is a metallic current collector. The high surface area carbon may include a catalyst to form an active catalyst layer. The net result is a catalyzed carbon material that is wetted by the liquid electrolyte of the cathode compartment, and includes microscopic spaces or pores for the diffusion of air. The electrochemical reduction of oxygen in air occurs at the 3-phase boundary between air, electrolyte and carbon. The operation of the cell is initiated by making an electrical connection between the anode and cathode. FIG. 6 shows the decreasing conductivity 605 of the diluate solution over time due to desalination and the decreasing discharge current 610 of the cell due to the increase in resistance of the diluate. This result shows removal of ions (desalination) and electrical energy production occurring coincidentally. The cathode endplate was fabricated with openings to allow ambient air access to the cathode electrode. A single membrane pair was used including Neosepta AMX and Nafion® 212 for the anion and cation exchange membranes, respectively. Plastic mesh spacers were used between the Mg anode, air cathode, and ion exchange membranes. Used for the anode electrolyte, cathode electrolyte, and diluate was 100 mL of 0.6M NaCl and was recirculated at 10 mL/min through each compartment using peristaltic pumps. A potentiostat was connected to tabs of the Mg anode and air cathode and discharged at a constant voltage of 0.1V while the discharge current 610 was recorded. Conductivity of the recirculated diluate solution was also monitored using a bench top conductivity meter. This correlation between discharge current 610 and level of desalination allows for self-regulation since, once the feed water is desalinated to drinking water levels, the high electrical resistance limits further discharge of the metal-air desalination battery cell. This is an important advantage because it prevents wasted energy from the metal anode, eliminates the need for complex control electronics, and provides a method to use discharge current 610 to indicate the level of desalination without additional sensors.

The dimensions of the magnesium anode changed as expected during operation, due to loss of electrode material. Visual inspection indicated a loss of solid material from the magnesium electrode surface. A loss in mass of 25-35% versus the initial mass was assessed. At the completion of the test, amorphous insoluble deposits were observed loosely attached to the electrode (in addition to soluble $MgCl_2$) indicative of the formation of insoluble magnesium oxyhydroxides, from hydrolysis side reaction such as $Mg+2H_2O \rightarrow Mg(OH)_2+H_2$. Suspended solids of magnesium oxyhydroxides were observed to accumulate in the anode electrolyte during operation of the cell. Continued operation of the cell resulted in complete depletion of solid magnesium electrode material and the formation of a sludge material in the anode compartment.

Embodiments of the present invention may use magnesium, aluminum, and zinc anodes. A comparison of the anode materials is shown in Table 2:

TABLE 2

Comparison of candidate anode materials for metal-air desalination batteries.

| Metal | Anode Reaction | Battery Voltage | Specific Energy | Desalination Capacity 1 Membrane Pair* | Desalination Capacity 5 Membrane Pairs* |
|---|---|---|---|---|---|
| Aluminum | $Al \rightarrow Al^{3+} + 3e^-$<br>$Al^{3+} + 3Cl^- \rightarrow AlCl_3$ | 2.06 V | 2980 mAh/g | 185 kg potable $H_2O$ per kg Al<br>(185 lbs potable $H_2O$ per lb Al) | 925 kg potable $H_2O$ per kg Al<br>(925 lbs potable $H_2O$ per lb Al) |

TABLE 2-continued

Comparison of candidate anode materials for metal-air desalination batteries.

| Metal | Anode Reaction | Battery Voltage | Specific Energy | Desalination Capacity 1 Membrane Pair* | Desalination Capacity 5 Membrane Pairs* |
|---|---|---|---|---|---|
| Magnesium | $Mg \rightarrow Mg^{2+} + 2e^-$ $Mg^{2+} + 2Cl^- \rightarrow MgCl_2$ | 2.77 V | 2205 mAh/g | 137 lbs potable $H_2O$ per lb Mg (137 lbs potable $H_2O$ per lb Mg) | 685 lbs potable $H_2O$ per lb Mg (685 lbs potable $H_2O$ per lb Mg) |
| Zinc | $Zn \rightarrow Zn^{2+} + 2e^-$ $Zn^{2+} + 2Cl^- \rightarrow ZnCl_2$ | 1.16 V | 820 mAh/g | 51 lbs potable $H_2O$ per lb Zn (51 lbs potable $H_2O$ per lb Zn) | 255 lbs potable $H_2O$ per lb Zn (255 lbs potable $H_2O$ per lb Zn) |

*Theoretical, based on the complete desalination of saltwater containing 35 g/L NaCl.

As the anode half-cell reactions show, all three anode materials remove one Cl⁻ ion per electron produced. Using Faraday's constant, 96,485 coulombs/mole (C/mol) (26.8 Ampere-hours/mole (A-h/mol)), this corresponds to a theoretical desalination energy requirement of 16 A-h/L for seawater containing 0.6M NaCl. This theoretical energy requirement highlights two critical features of the metal-air desalination battery approach: (1) the desalination rate (L/hr) is directly proportional to the battery discharge current 610; and (2) the desalination capacity of a metal-air desalination battery device is dictated by the specific energy of the anode (amount of current that can be generated per mass of anode).

For example, aluminum possesses the highest specific energy, 2980 mA-h/g, which corresponds to a theoretical desalination capacity of 925 kg of desalinated seawater per kilogram of aluminum (925 lbs./lb. Al) consumed assuming the use of five electrodialysis membrane pairs. Magnesium has the second highest specific energy, 2205 mA-h/g, which corresponds to 685 kg of desalinated seawater per kilogram of magnesium (685 lbs./lb. Mg) with five membrane pairs. Zinc has the lowest specific capacity of the three, 820 mA-h/g which corresponds to 255 kg of desalinated water per kilogram of Zn (255 lbs./lb. Zn) with five membrane pairs. All three anode materials are very inexpensive with costs of US$1-2 per pound. Assuming multiple electrodialysis membrane pairs are used, the material cost from anode consumption to produce a liter of potable water from seawater can be well below US$0.01.

Figure 7A:
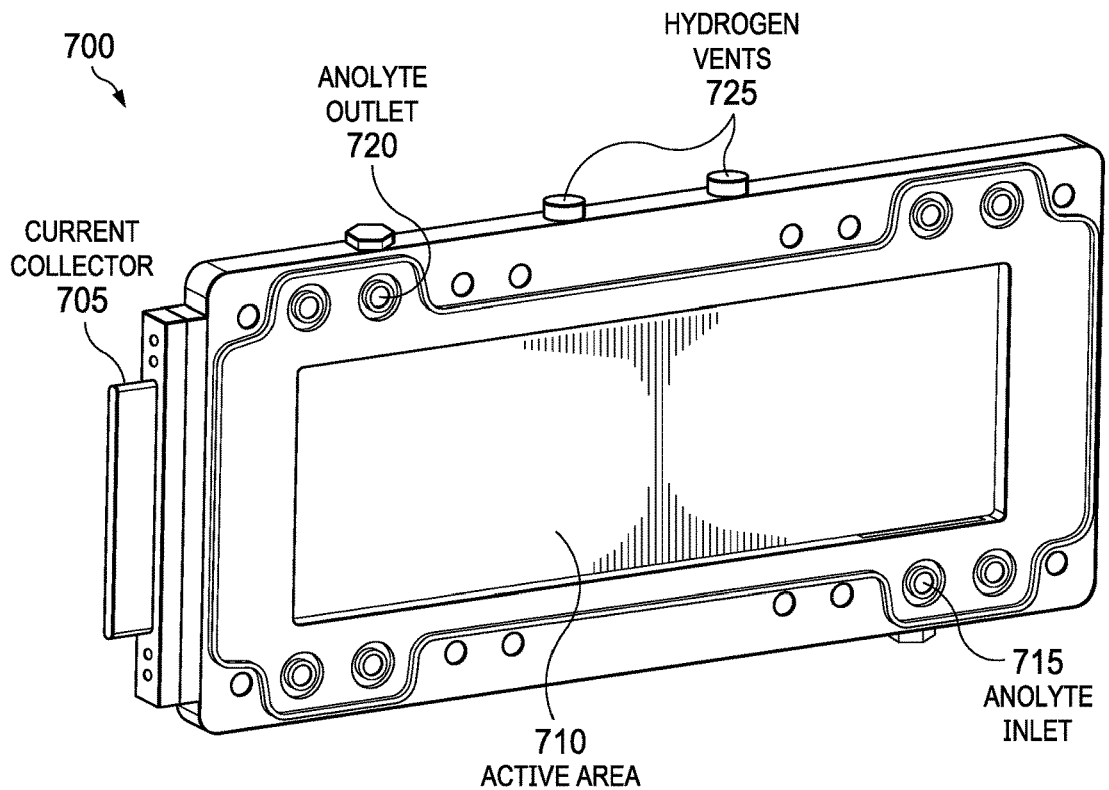
FIGS. 7A and 7B show additional aspects of a desalination system that uses commercial AZ31 magnesium plate that is mounted in a polymer or metal holder to create a cartridge for use with the present invention.
Figure 7B:
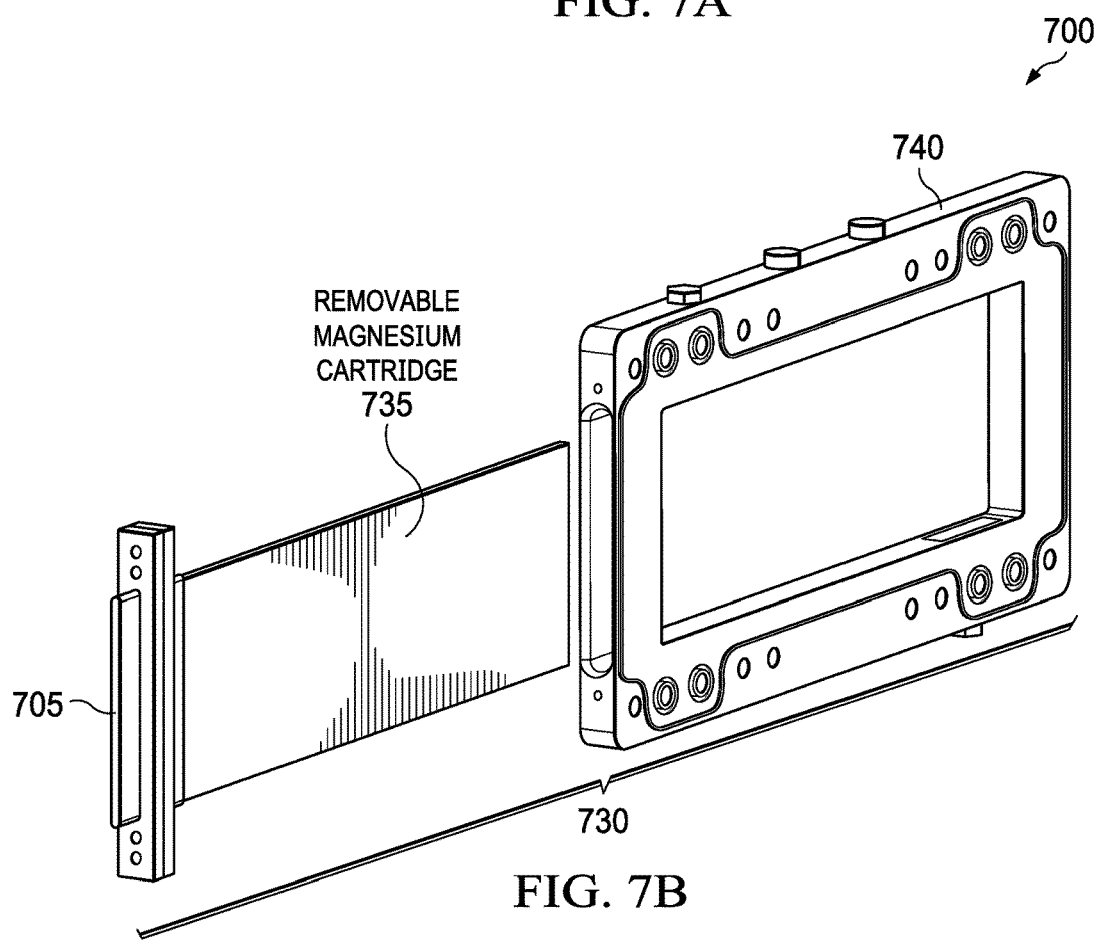

FIGS. 7A and 7B show aspects of a desalination system that uses commercial AZ31 magnesium plate which is mounted in a polymer or metal holder to create a cartridge. FIG. 7A shows a metal-air desalination battery 700 that includes current collector 705, active area 710, anolyte inlet 715, anolyte outlet 720, and hydrogen vents 725. FIG. 7B shows cartridge assembly 730, which includes current collector 705, removable magnesium cartridge 735, and cartridge holder 740. Metal-air desalination battery 700 uses commercial AZ31 magnesium plate 735, which is mounted in a polymer or metal holder 740 to create a cartridge 730 which allows a user to simply unclip or unscrew the magnesium plate 735, the anode, for removal from metal-air desalination battery 700. Multiple mechanisms can be used to mechanically recharge metal-air desalination battery systems once an anode is consumed during the desalination process as is known in the state of the art for metal-battery (for reference, see U.S. Pat. No. 4,950,561, "Metal Air Battery with Easily Removable Anodes," issued to Niksa et al., Aug. 21, 1990, relevant portions incorporated herein by reference). Recharging using mechanical approaches include but are not limited to physically replacing anodes, cartridges, and similar designs. Alternatively, anode materials (e.g., in the form of sludge) can also be pumped into the cell to create a "semi-fuel cell." Up to this point, we describe the desalination/electrical energy generation process as achieved by oxidation of a metal anode by oxygen at a cathode. The reaction can approach completion when all metal anode has reacted. Here we describe an aspect of the invention, where a partially reacted anode or completely reacted anode is reformed by electrodeposition of metal ion anode material from solution. There are two cycles: (1) charge cycle involving desalination combined with electrical energy generation; (2) discharge cycle involving desalination combined with electrodeposition of anode material. This aspect of the invention requires polarity reversal (i.e., the electrical current switches direction). The discharge cycle requires input of electricity from an external source. Desalination continues uninterrupted during both charging and discharging cycles, even though current flow is reversed. This aspect of the invention requires alternating fluid flow pattern leading to the apparatus and leading away from the apparatus, in coordination with the change from charge cycle to discharge cycle and vice versa. The invention does not require preparation and use of a specialty electrolyte containing redox agents.

Figure 8A:
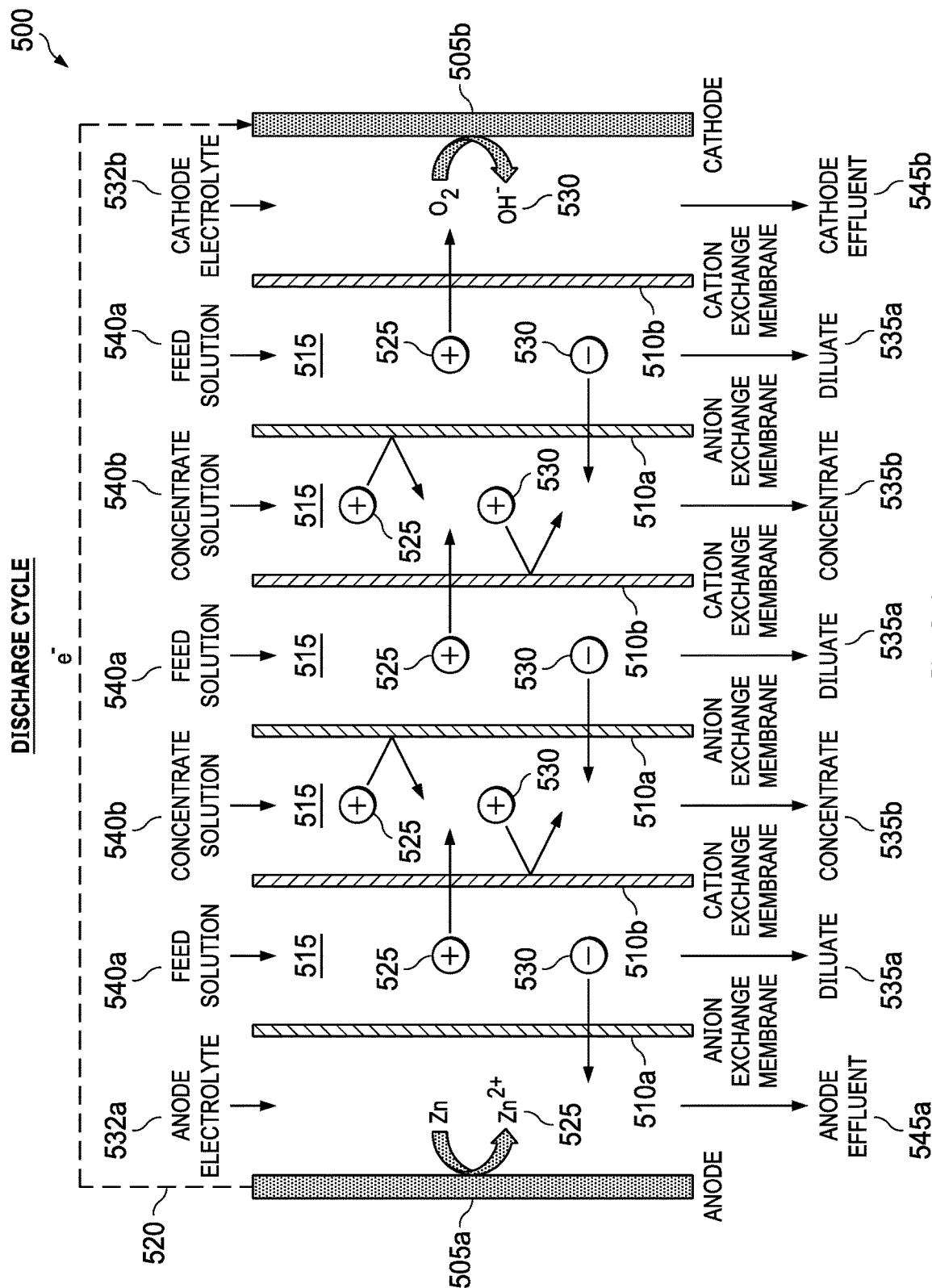
FIGS. 8A and 8B show the discharge cycle and the charge cycle, respectively, of an electrically rechargeable zinc-based metal-air desalination battery of the present invention.
Figure 8B:
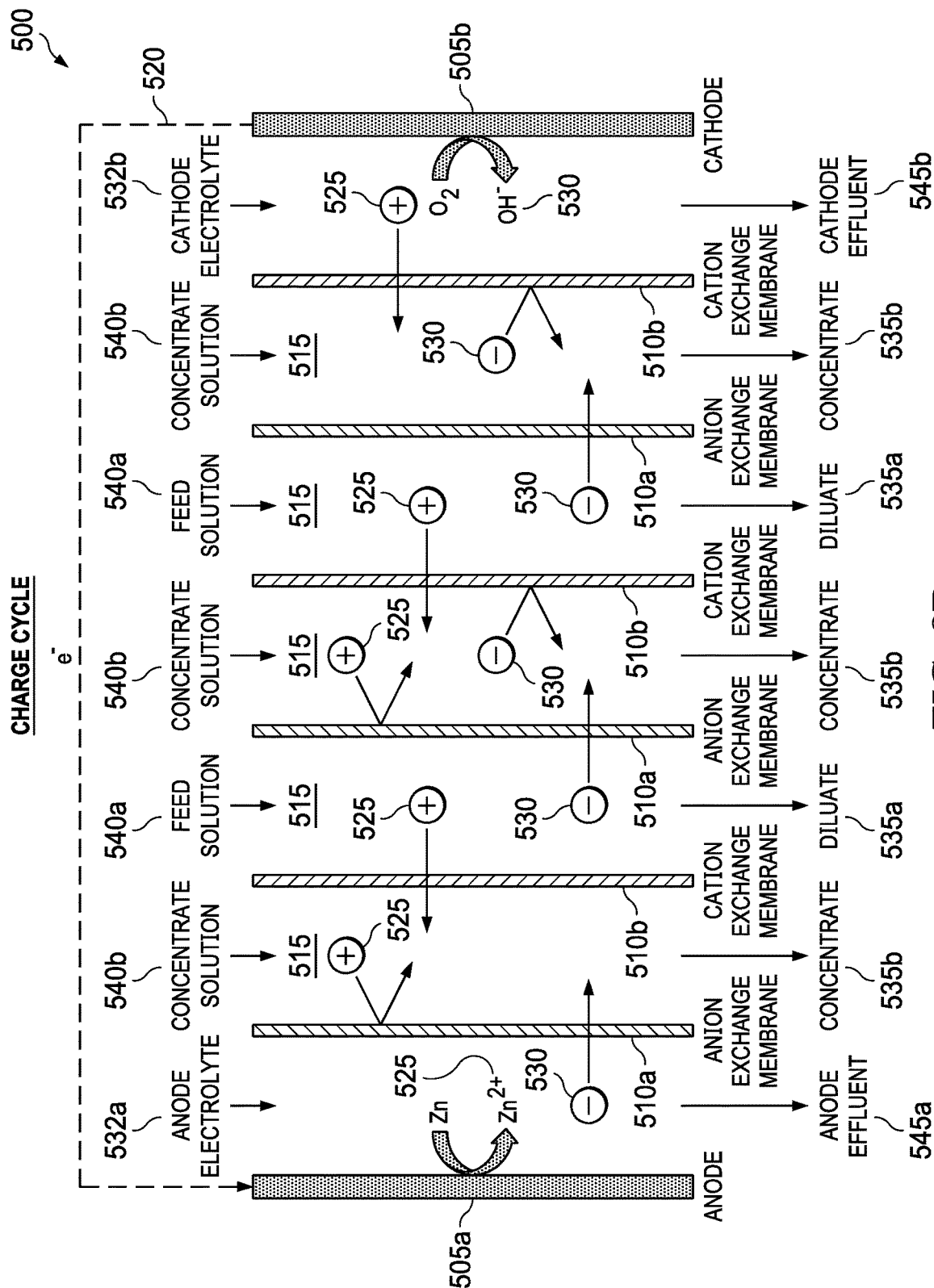

FIGS. 8A and 8B show the discharge cycle and the charge cycle, respectively, of an electrically rechargeable zinc-based metal-air desalination battery 500. FIGS. 8A and 8B depict metal-air desalination battery, including anode 505a, cathode 505b, AEMs 510a, CEMs 510b, flow channels 515, external electrical circuit 520, positive ions 525, negative ions 530, anode electrolyte 532a, cathode electrolyte 532b, diluate streams 535a, concentrate streams 535b, feed solution streams 540a, concentrate streams 540b, anode effluent streams 545a, and cathode effluent streams 545b. In some embodiments, the metal-air desalination battery system 500 can be also be electrically recharged. To be electrically rechargeable, both anode and cathode half-reactions need to be reversible. Of the anode materials considered, zinc is the most reversible anode. Prior work has shown the potential to create electrically rechargeable zinc-air batteries. During the discharge cycle, the metallic zinc anode 505a is converted to zinc ions which combine from anions such as Cl⁻ drawn through an anion exchange membrane 510a to form a zinc salt such as $ZnCl_2$. Simultaneously at the cathode 505b, oxygen from air is converted to hydroxyl anions and combines with cations such Na⁺ to form soluble salts such as NaOH. The net result is the removal of a salt such as NaCl and the formation of $ZnCl_2$ and NaOH at the anode 505a and cathode 505b, respectively. When multiple pairs of anion exchange membranes 510a and cation exchange membranes 510b are used, alternating flow channels containing diluate streams 535a and concentrate streams 535b are formed.

During the charge cycle, an external power supply (not shown) is used to apply current 520 to the cell and the entire process is reversed. Zinc salts 525 produced at the anode 505a during the discharge cycle are converted back to metallic zinc and hydroxyl anions 530 in the cathode are converted back to $O_2$ gas. The flow of ions is also reversed with anions such as $Cl^-$ being drawn towards the air cathode and cations such as $Na^+$ being drawn towards the zinc anode 505a. Due to this reversal in ion flow, diluate channels 535a during the discharge cycle become concentrate channels 535b during the charge cycle. Similarly, concentrate channels 535b during the discharge cycle become diluate channels 535a during the charge cycle, allowing desalinated water to be produced in the charge cycle. When changing from discharge cycle to charge cycle, the fluid flows serving the diluent compartments are reconfigured to serve the concentration compartments. Likewise, when changing from discharge cycle to charge cycle, the fluid flows serving the concentration compartments are reconfigured to serve the diluent compartments. Reconfiguration of fluid flows can be achieved using valves, switches or flow diverters located external to the apparatus. Thus, desalination can be performed during both the discharge and charge cycles for an electrically rechargeable metal-air desalination battery system 500. This is a particular advantage for combining the metal-air desalination battery with a renewable energy source such as solar power since it allows for continuous desalination to occur during the day using the charge cycle and at night using the discharge cycle.

Figure 9A:
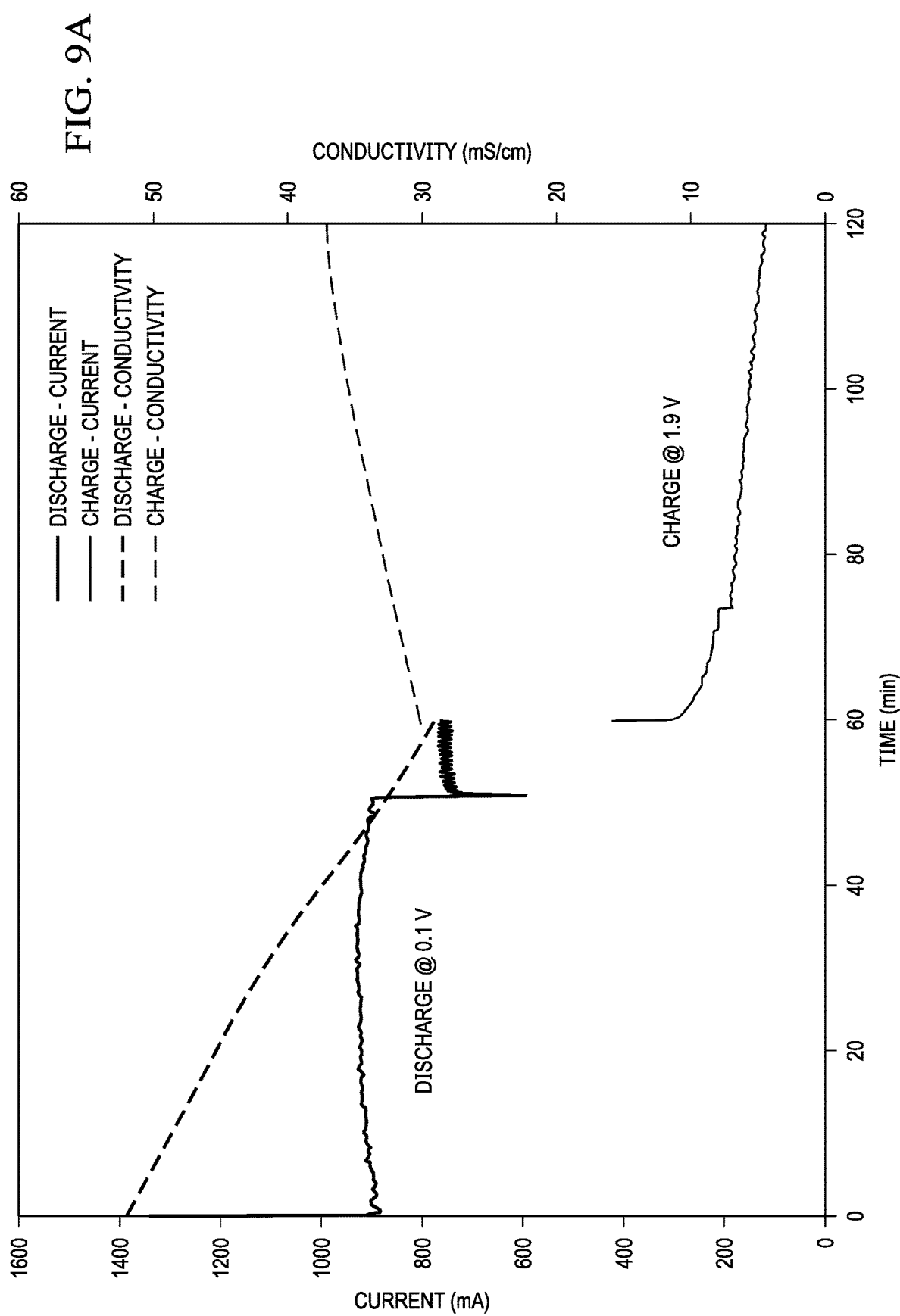
FIG. 9A is a graph that shows the effect of performing a discharge and charge cycle on a zinc-based metal-air desalination battery (MADB) cell with a single membrane pair using the present invention.

Preliminary data showing the effect of performing a discharge and charge cycle on a zinc-based MADB cell with a single membrane pair is shown in FIG. 9A. Salinity of the feed water between the anion and cation exchange membranes decreases during discharge as with a non-rechargeable magnesium-based cell. When external power is applied, the process reverses and the salinity of the feed water between the anion and cation exchange membrane increases. As discussed above, use of multiple membrane pairs would allow for desalination to occur during both the charge and discharge cycles. In this way, the desalination invention can be cycled between discharge and charging cycles multiple times, such that the anode material is not depleted. Continuous operation is achieved.

A custom test cell with an active area of 50 cm$^2$ was used to perform a test of the reversible MADB cell using a Zn anode. The anode endplate was fabricated from G-10 fiberglass board. The cathode endplate design included a 50 cm$^2$ open area with ribbed supports for air-breathing cathode operation. The anion exchange membrane (Fumapem FAA, Fumatech GmbH) and cation exchange membrane (Nafion 112, Dow Chemical) were supported using 0.010" thick polyetherimide (Ultem 1000, Boedecker Plastics) sheets. Frames for each of the compartments including die cut silicon rubber to form a 0.5 mm gap between the membranes and electrodes. The Zn electrode was cut from 0.063" thick commercially pure Zn plate and sanded to remove surface oxidation before assembling. The Zn electrode included a tab for current collection. For preliminary data, we used Pt catalyst on Teflonized carbon gas diffusion layer (GDL) as the cathode catalyst since it was readily available even though Pt is well known to be a poor catalyst for reversible air electrodes.

For testing, three separate containers of 100 mL of 35 g/L NaCl were independently recirculated through the anode, intermembrane (desal), and cathode compartments at a flow rate of 15 mL/min using a multichannel peristaltic pump. The test cell was then connected to a Versastat potentiostat and discharged for 1 hour at 0.1V for desalination mode (0 to 60 min on FIG. 9). The conductivity of the solution recirculated through intermembrane (desal) compartment was monitored with a benchtop conductivity meter. The conductivity of the desal solution linearly decreased from 52.3 to 29.3 mS/cm during the 1 hour discharge in desalination mode. During discharge (desalination mode), ions from the center desal compartment were transported across the ion exchange membranes forming $ZnCl_2$ and NaOH at the anode and cathode, respectively.

At the end of the 60 min discharge test, the potentiostat was used to charge the test cell at 1.9V for 1 hour for salination mode (60 to 120 min on FIG. 9A). During the charge cycle (salination mode), the conductivity of the desal solution increased from 29.3 to 37.1 mS/cm. During the charge cycle (salination mode), $ZnCl_2$ in the anode solution was converted to Zn metal (plated onto the Zn electrode) and $Cl^-$ ions whereas the NaOH in the cathode solution was converted to $O_2$, $H_2O$, and $Na^+$ ions. The $Cl^-$ and $Na^+$ ions are transported back across the ion exchange membranes into the center compartment to form a brine solution. The rate of salination was lower than the desalination rate as indicated by the lower current in salination mode vs. desalination mode. This lower current is due to the poor reversibility of the air cathode using Pt catalyst.

Figure 9B:
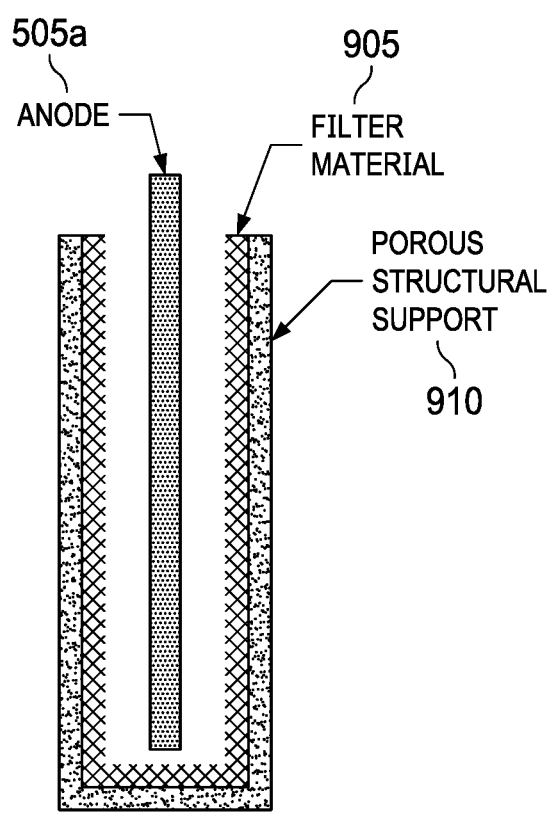
FIG. 9B shows a removable anode with a filter material for sludge.

Anodes such as magnesium produce a significant amount of sludge during discharge that includes primarily $Mg(OH)_2$, which is formed by a side reaction between magnesium and water. This sludge can be continuously flushed out of the anode compartment during operation if the stack is properly designed to prevent clogging. However, one embodiment includes filtering the sludge in place against the anode 505a to eliminate potential issues with clogging. The volume of $Mg(OH)_2$ sludge produced from a magnesium anode 505a after complete discharge has a volume that is 2-3-fold more than the original magnesium volume due to a lower density. An embodiment for removable anodes 505a such as magnesium is shown in FIG. 9B. The anode 505a is surrounded by a filter material 905 which traps the byproduct sludge. The filter material 905 can be anything known in the state of the art including, but not limited to, woven, non-woven, perforated, and sintered polymers, metals, ceramics, and composites. For magnesium anodes, the filter material 905 should be able to trap particles with a size of approximately 50 micron or less. The porosity of the filter material 905 should be as high as possible to maximize ionic conductivity with the surrounding anode electrolyte. Optionally, a porous structural support material 910 can be used to provide rigidity to the assembly and prevent ballooning of the filter material 905 as the anode 505a is discharged and byproduct sludge accumulates. FIG. 9B shows anode 505a, filter material 905, and porous support structure 910.

There are a number of potential advantages to using a MADB over traditional electrodialysis. A MADB is self-powered and eliminates the need for external power supplies and control electronics to drive electrodialysis which can lead to significant weight and volume savings. Additionally, the energy efficiency of the desalination battery is significantly better than traditional electrodialysis since no current is wasted on control electronics or the electrolysis of water. While the energy cost of water electrolysis is insignificant on large-scale electrodialysis systems, it becomes a considerable parasitic power loss for small scale designs. The desalination battery is self-limiting since the current discharged though the battery decreases proportionally to the level of desalination due to increased ohmic resistance. Once desalination is complete and highly deionized water is generated, the desalination battery will no longer discharge any current. The desalination battery also appears to be ideal for small desalination systems since they are activated by addition of seawater or brackish water. When stored dry, the desalination battery should possess a very long shelf life (10-20 years).

Figure 10:
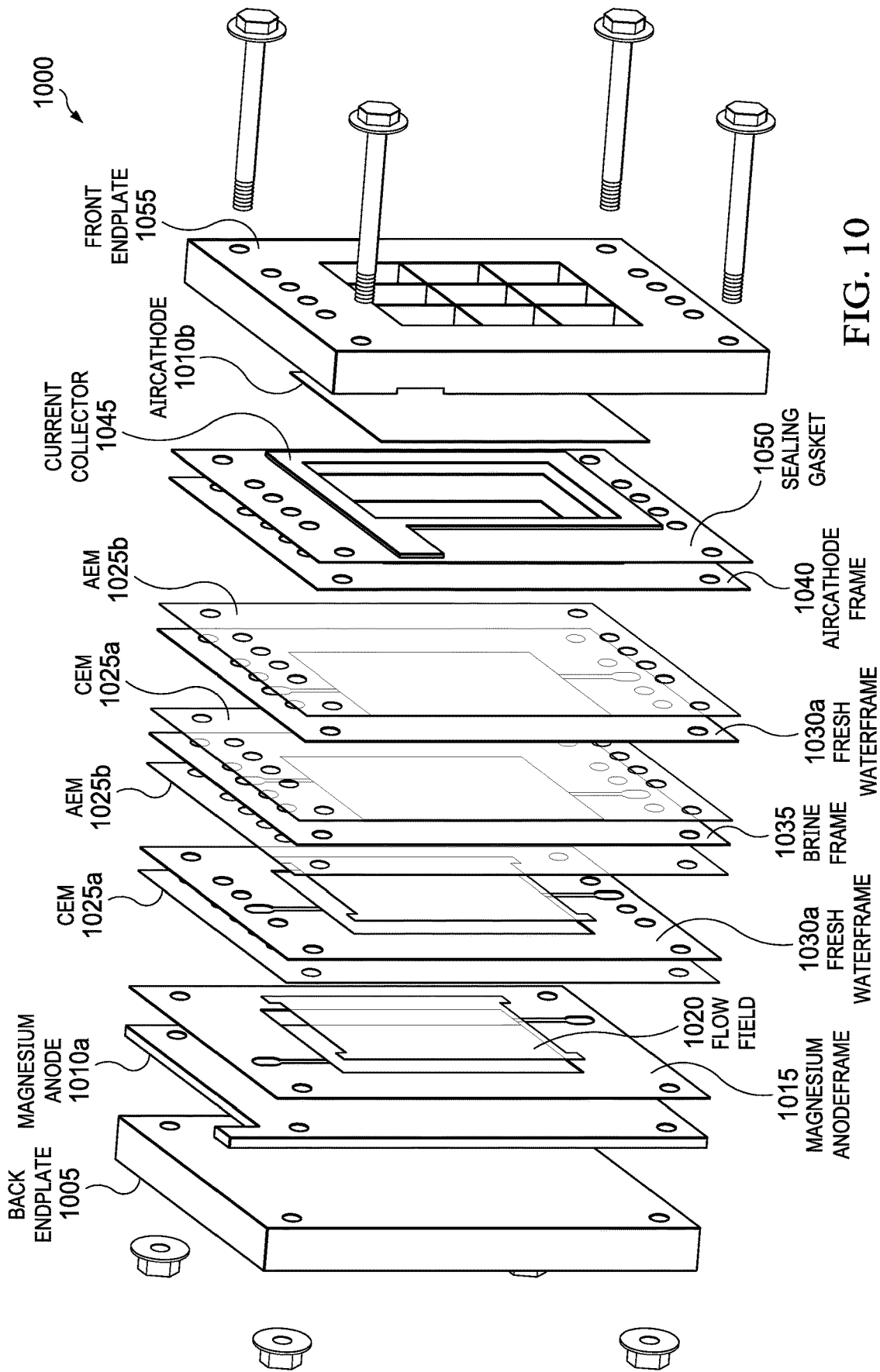
FIG. 10 depicts one example of a plate-and-frame architecture for a metal-air desalination battery of the present invention.
Figure 11:
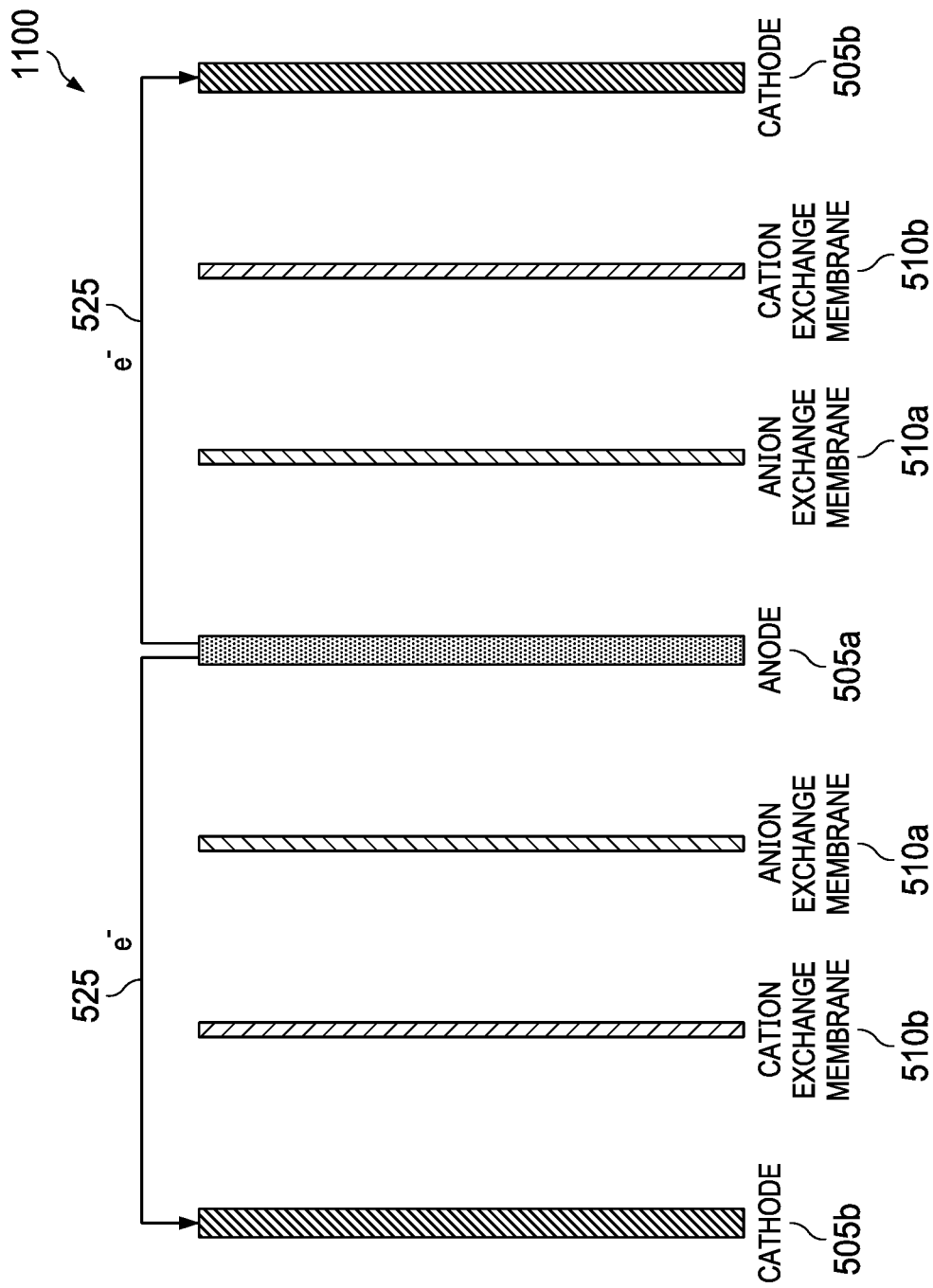
FIG. 11 illustrates another example of the plate-and-frame architecture with a single anode is electrically coupled to two cathodes, forming two complete cells that include a "substack" of the present invention.

In one embodiment, the overall architecture of the MADB cell is a conventional "plate-and-frame" or "filter press" design common with fuel cells and electrodialysis systems. Alternative architectures can also be envisioned including but not limited to cylindrical, spiral wound, and pouch designs. For the plate-and-frame architecture, planar components including electrodes, membranes, and separators are layered to form a single cell. An example of this design is shown in FIG. 10, which shows a plate-and-frame architecture 1000, including back endplate 1005, magnesium anode 1010a, air cathode 1010b, magnesium anode frame 1015, flow field 1020, CEMs 1025a, fresh water frames 1030a, AEMs 1025b, brine frame 1035, air cathode frame 1040, current collector 1045, sealing gasket 1050, and front endplate 1055. In one embodiment, a single anode is electrically coupled to two cathodes, forming two complete cells that include a "substack" as shown in FIG. 11. FIG. 11 shows a substack 1100, including an anode 505a, two cathodes 505b, two pairs of AEMs 510a and CEMs 510b, and two external electrical circuits 525. This approach maximizes use of the anode 505a and decreases overall stack weight and volume. Multiple substacks 1100 can be used to form a full stack where the substacks 1100 are fluidically in series or parallel and electrically in series or parallel.

For the plate-and-frame architecture, planar components can be used. Compatible anode forms include but are not limited to plate, foil, paste, or slurry. Examples include commercial AZ31 magnesium wrought plate. Cast magnesium can also be used to fabricate anode from multiple alloys including AZ91. In an embodiment, the cathode is the use of commercial battery air cathodes designed to operate with gaseous air as an oxygen source while the catalyst layer is in contact with liquid electrolyte. The air cathodes typically include a nickel mesh current collector, hydrophobic carbon layer containing $MnO_2$ catalyst, and a porous PTFE layer to prevent loss of fluid. Examples include commercial air cathodes such as E-4 and E-4B manufactured by Electric Fuel Limited. Workable ion exchange membranes have the following features: high ionic conductivity and low ohmic resistance; high permselectivity; chemical resistance; and good mechanical strength. Examples anion exchange membranes include FAA grade membranes from Fumatech GmbH and Neosepta® AMX from Astom Corporation. Suitable cation exchange membranes include Dupont's Nafion® membrane and Neosepta® CMX from Astom Corporation. Frames can be made from any electrically insulating material with chemical compatibility including but not limited to PVC, polypropylene, PEEK, and PEI. The workable materials for endplates are rigid materials and can be either made from polymers, composites such as G10 fiberglass, or conductors such as metals or carbon fiber composites if precautions are taken to prevent shunt currents between the anode, the cathode, and the associated electrolytes.

The desalination rate directly correlates to the discharge current for the metal-air desalination battery. The maximum discharge current for a MADB system is controlled by several factors, including: (1) the active area of the cell; (2) stack resistance; and (3) electrode properties. Stack resistance depends on (a) inter-membrane spacing (gap distance) between electrodes and electrodialysis membranes and between membrane pairs; (b) electrodialysis membrane ionic conductivity; and (c) electrolyte conductivity (dictated by feed water conductivity and level of desalination). Electrode properties depend on (a) anode passivation; (b) anode surface area; and (c) cathode performance.

Figure 12A:
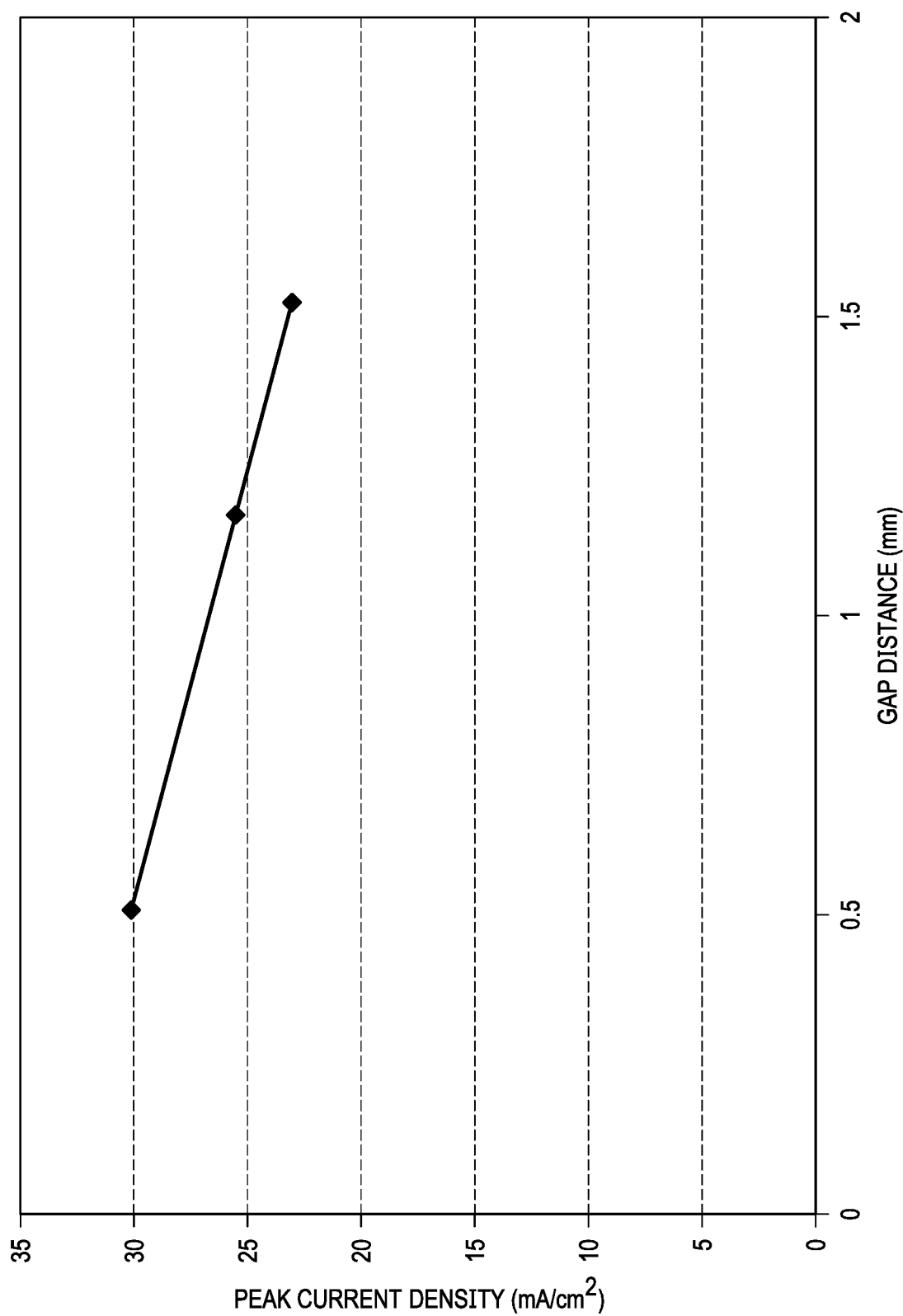
FIG. 12A is a graph that shows a linear relationship between gap distance between membranes and discharge current in testing of a Mg-metal air desalination battery of the present invention.

During initial testing of the Mg-MADB test cell, a linear relationship between gap distance between membranes and discharge current was demonstrated, as illustrated in FIG. 12A. Smaller gap distances reduce the electrical resistance between the anode and cathode and enable higher discharge currents which in turn increase the desalination rate. The only practical limit in minimizing gap distance is the increase in pressure drop at a given flow rate. This increase in fluid pressure drop for small gaps increases pump power requirements and eventually overcomes the benefit of increased discharge current. Another factor related to gap distance are the properties of the spacers which are required to supply mechanical support to the membranes and provide turbulent flow to prevent ion concentration polarization effects.

As described herein, it is desirable to minimize the spacing between the components (electrodes and membranes) in the MADB system. In configurations of the MADB system which utilize a removable anode 505a for mechanical rechargeability, the gap between the anode 505a and the anion exchange membrane (AEM) 510a will be larger than optimal to accommodate the removable anode components. The large gap between the anode 505a and the AEM 510a leads to low fluid velocities which in turn can reduce overall desalination performance and efficiency due to concentration polarization effects.

Figure 12B:
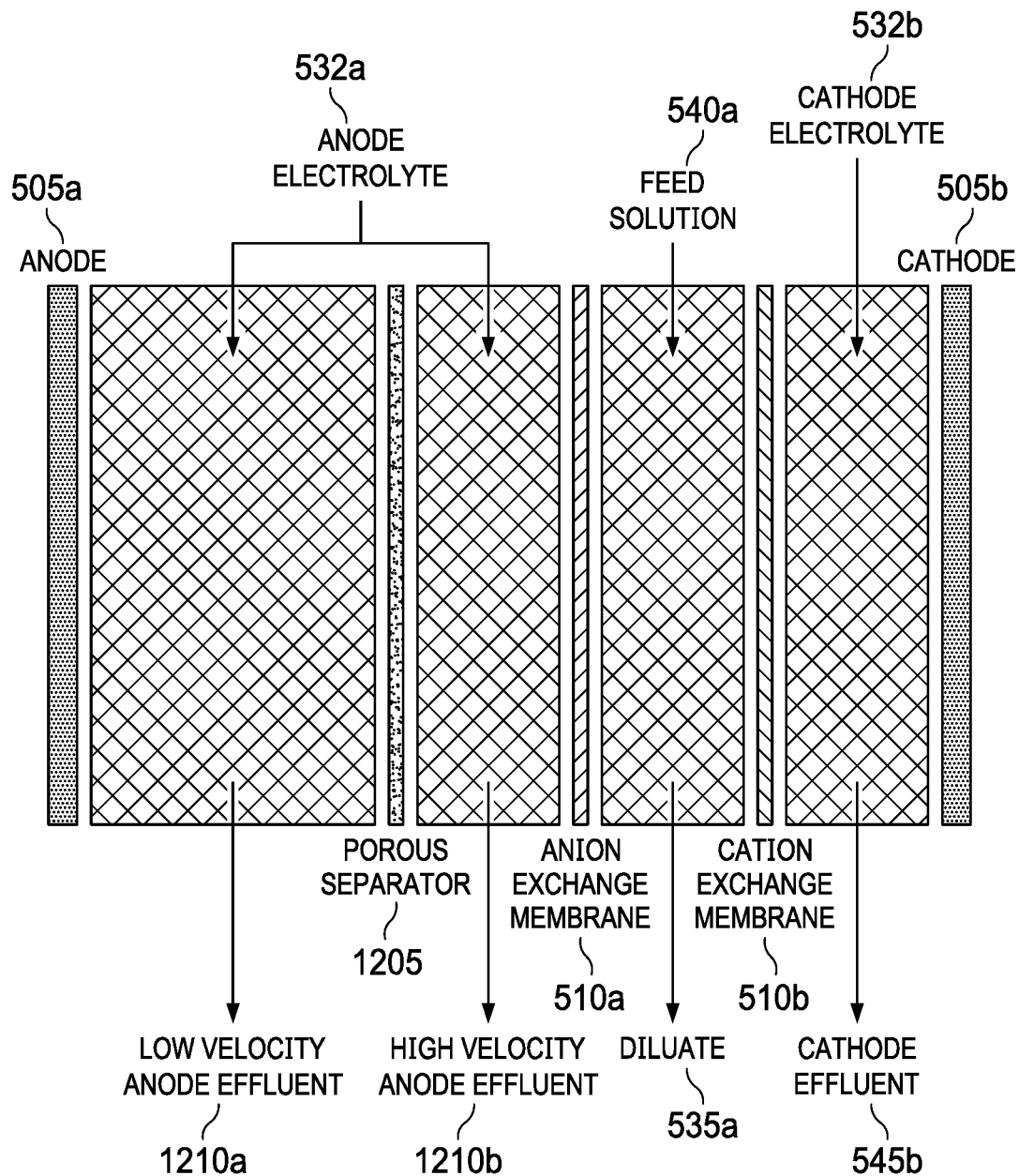
FIG. 12B shows an anode with a large anode-to-anion-exchange-membrane gap and two anode electrolyte flow fields.

An embodiment for designs which utilize removable anodes 505a and large anode-to-AEM gaps splits the anode electrolyte into two flow fields, low-velocity anode effluent 1210a and high-velocity anode effluent 1210b, that are ionically connected using a porous separator 1205, as illustrated in FIG. 12B. A smaller gap flow field is used against the AEM 510a to increase fluid velocity and minimize concentration polarization while a flow field with a larger gap is used against the anode 505a. A porous separator 1205 is used to separate the two anode electrolyte flow fields 1210a and 1210b, which provides ionic conductivity while minimizing fluid transfer between the two flow fields 1210a and 1210b. The porous separator 1205 can be made from any material, e.g., metals, polymers, glass, ceramics, and composites. Examples of metal porous separators 1205 include, but are not limited to, perforated, sintered, and mesh materials made from chemically compatible materials such as stainless steel, titanium, or nickel, or some combination. Examples of suitable polymer-based porous separators 1205 include, but are not limited to, woven and non-woven materials such as meshes, fabrics, and sintered materials made from nylon, polyethylene, or cellulose, or some combination. FIG. 12B shows anode 505a, anion exchange membrane 510a, cation exchange membrane 510b cathode 505b, anode electrolyte 532a, cathode electrolyte 5352, diluate 535a, feed solution 540a, cathode effluent 545b, porous separator 1205, low-velocity anode effluent 1210a, and high-velocity anode effluent 1210b.

Properties such as thickness and porosity of the separator can be adjusted to maximize the ionic conductivity while minimizing fluid transfer between the two flow fields based on the operating conditions such as flow rate and pressure drop through each flow field. Additionally, the porous separator can also be designed to provide mechanical support to the rest of the stack components. If the separator provides mechanical support, an open flow field for the anode can be used which can make the removal of spent anodes easier.

The gaps between membranes and between membranes and electrodes define the flow path for solutions in the stack. In traditional electrodialysis stack designs, a spacer made from a plastic mesh such as nylon is typically placed in the gaps between membranes to prevent the membranes from touching and promote turbulence in the fluids to minimize issues with concentration polarization. While MADB spacer requirements are similar, there are some additional unique spacer design requirements.

A number of different spacer designs have been evaluated with the goal of maximizing desalination rate and minimizing the potential for clogging for the anode and cathode electrolytes. During testing of new spacer designs, these critical properties which affect desalination rate have been identified: (1) thickness, because thinner spacers reduce inter-membrane distance, reducing ohmic resistance and increasing current leading to higher desalination rates; (2) shadow effect, because the open area of the spacer determines how much area of the ion exchange membranes is blocked (for example, a spacer with a 25% open area will reduce the active area of the ion exchange membranes by 75%, reducing the desalination rate approximately 75%); (3) flow distribution, because even distribution and mixing of fluids in the spacers is important for maximizing efficiency and reducing the effects of concentration polarization (locally depleted and/or concentrated ion concentrations); (4) physical support, because another important role of the spacers is to physically support the membranes and electrodes to keep the membranes separated; and (5) pressure drop, because pressure drop determines the maximum flow rates and pump power required to operate the system.

TABLE 3

Summary of the spacers tested to date and their general properties.

| Spacer Type | Thickness | Open Area | Flow Distribution | Physical Support | Pressure Drop |
| --- | --- | --- | --- | --- | --- |
| None (open) | Thin (10-40 mils) | Excellent, 100% | Poor | None | Low |
| Plastic mesh | Thin (10-40 mils) | Low, 40-60% | Good | Excellent | Moderate |
| Serpentine | Thin (10-40 mils) | Medium, 50-70% | Excellent | Excellent | High |
| Open cell foam | Thick (40-250 mils) | Excellent, >90% | Good | Good to Excellent | Low |

Eliminating the spacer altogether completely eliminates the issue of shadow effect and ensures full use of the membrane active areas with no pressure drop, but this provides no physical support of the membranes and can lead to poor flow distribution. Plastic meshes are standard spacers for traditional electrodialysis systems due to their low cost but suffer from large shadow effect, moderately high pressure drops, and mediocre flow distribution. Examples of plastic mesh spacers include nylon Nitex meshes produced by Sefar, Inc. Serpentine spacers can greatly improve flow distribution but at a cost of much higher pressure drops, and they still suffer from significant shadow effects. Serpentine spacers are typically fabricated from nylon or PVC sheets, which are then die cut, waterjet cut, or laser cut to form the serpentine flow pattern. Open cell foams are available with excellent open areas, low pressure drops, and decent flow distribution but are typically thick materials leading to large intermembrane gaps.

In addition to the general spacer requirements discussed above, the anode and cathode electrolyte spacers can have additional requirements. For magnesium anodes, large amounts of sludge are produced as a side reaction due to hydrolysis in water which can clog outlets. It has been found that open cell polyurethane (PU) foam provides an excellent spacer for the anode. Standard PU foam commonly used in shipping applications with a pore density of 60 pores per inch (ppi) was found to filter anode sludge in place, preventing clogging issues in the outlet or downstream tubing. Additionally, the PU foam is very compliant which allows the sludge layer to build on the anode without overcompressing the rest of the stack. Due to the large open area, the pressure drop across the PU foam only increases by a small amount even after compression due to sludge build-up.

The spacer for the air cathode electrolyte also has some additional requirements. First, spacer must be stable in a strong base since the cathode electrolyte can reach pH 14 when recirculated for long periods. Additionally, when operating on seawater (feed waters containing large amounts Mg and Ca), scale can be formed leading to clogging issues and loss of membrane active area. For this reason, open cell foam has an advantage over other options. However, polyurethane is not stable in high pH conditions. Nickel foam as the cathode electrolyte spacer was evaluated. The nickel foam is commercially available and fabricated by nickel plating polyurethane foam and then removing the polyurethane foam in a heat treatment process. The end result is a nickel foam that is structurally identical to standard PU foam but is stable in both saltwater and high pH environments. Additionally, it is commercially available in thicknesses as low as 0.050". An example of a suitable commercial nickel foam is INCOFOAM, manufactured by Inco Technical Services Limited.

Figure 13:
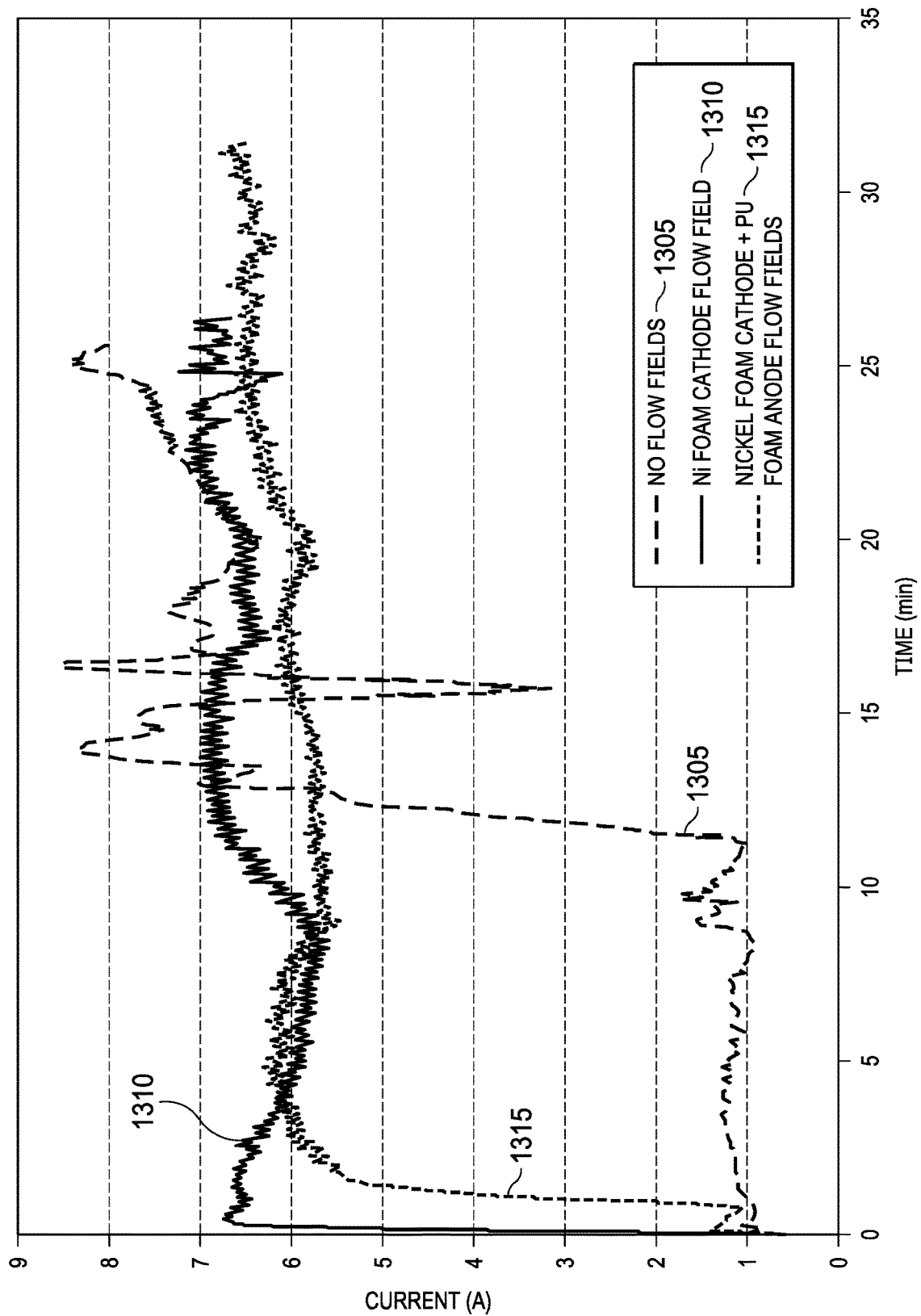
FIG. 13 is a graph that shows a comparison of cell performance with different spacer configurations of the present invention.

A series of studies were performed to quantify the effects of open cell PU foam in the anode and Ni foam in the cathode on cell performance. First a cell was assembled using a single membrane pair including a Fumatech FAA3-30 anion exchange membrane and a Nafion® 212 cation exchange membrane with a 20 mil gap between the membranes, and no spacer. The cell was first characterized with no anode electrolyte or cathode electrolyte spacers to determine cell performance with zero shadow effect. As shown by data plot 1305 in FIG. 13, the cell initially produced around 1 A of current. When backpressure was applied to the desalination stream, current rapidly increased to about 8 A. This effect is likely due to the collapse of the unsupported membranes, which were then separated after applying backpressure due to a ballooning effect. However, the high performance of the test cell with no spacers was difficult to maintain since strict pressure balances across the desalination feed, anode electrolyte, and cathode electrolyte spacers are needed to prevent the membranes from collapsing or ballooning too much. The cell was then disassembled and reassembled using a 0.127 cm (0.05 in.) thick 23.6 pores per cm (60 ppi) Ni foam compressed to 0.102 cm (0.04 in.) for the cathode electrolyte spacer, where the diluate and anode electrolyte spacers remained open. As shown by data plot 1310 in FIG. 13, cell performance was more stable and produced similar current to the no spacer control. Finally, the cell was taken apart and a 0.843 cm (0.375 in) thick 23.6 pores per cm (60 ppi) PU foam compressed to 0.2" was added for the anode electrolyte spacer. Again, as shown by data plot 1315 in FIG. 13, performance was comparable with a less than 10% drop in peak current compared to the no spacer control. This result demonstrates that the open cell PU and Ni foams do not cause a significant loss in performance due to shadow effect, which correlates well with their high open areas.

Figure 14:
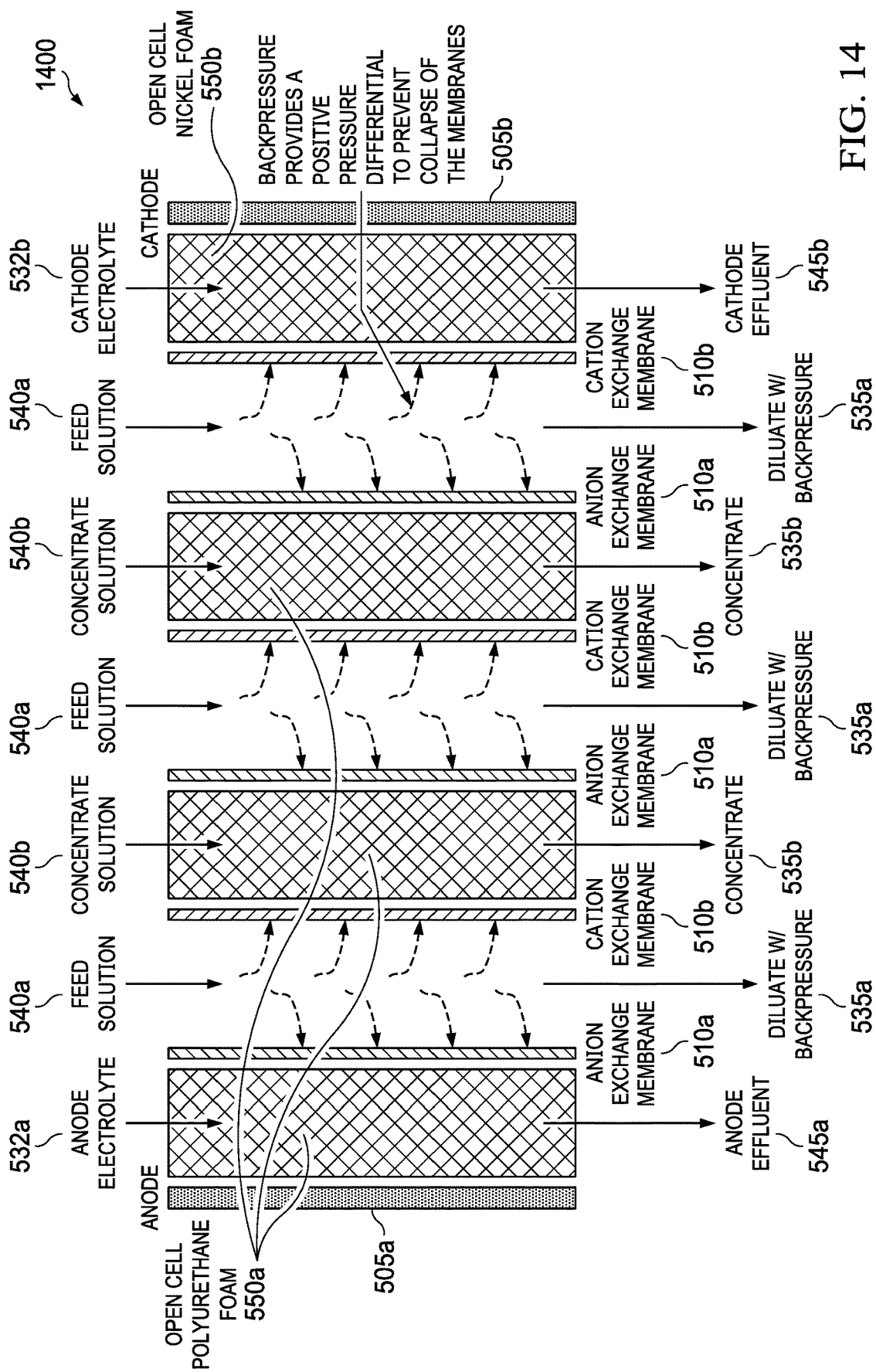
FIG. 14 shows a schematic of an unsupported diluate spacer but constrained on each side with the PU and Ni foams for use with the present invention.

The final configuration that was tested including an open diluate, Ni foam catholyte. A PU foam anode electrolyte spacer provided excellent performance that was stable and repeatable as long as sufficient backpressure was applied to the diluate feed to prevent the ion exchange membranes from collapsing. The anode electrolyte and cathode electrolyte spacers possess low pressure drops of less than 3.44 kPa (0.5 psi) at flow rates up to 20 mL/min, meaning that only 6.89-13.79 kPa (1-2 psi) of backpressure on the diluate feed was needed to prevent the membranes from collapsing. The lack of a diluate spacer and large open areas of the PU and Ni foams eliminate shadow effect. While the diluate spacer is unsupported, it is constrained on each side with the PU and Ni foams allowing the simple use of backpressure to maintain inter-membrane spacing without over-ballooning. A schematic of this configuration is shown in FIG. 14. FIG. 14 shows a system 1400, including anode 505*a*, cathode 505*b*, AEMs 510*a* and CEMs 510*b*, anode electrolyte 532*a*, cathode electrolyte 532*b*, diluate streams 535*a*, concentrate streams 535*b*, feed solution streams 540*a*, concentrate streams 540*b*, and open cell polyurethane foam spacers 550*a* and an open cell nickel foam spacer 550*b*. Anode sludge is contained by the PU foam and the high pH and scale formation is handled well by the Ni foam for the catholyte. To date, this configuration best meets all of the requirements for a high performance desalination battery.

Figure 15A:
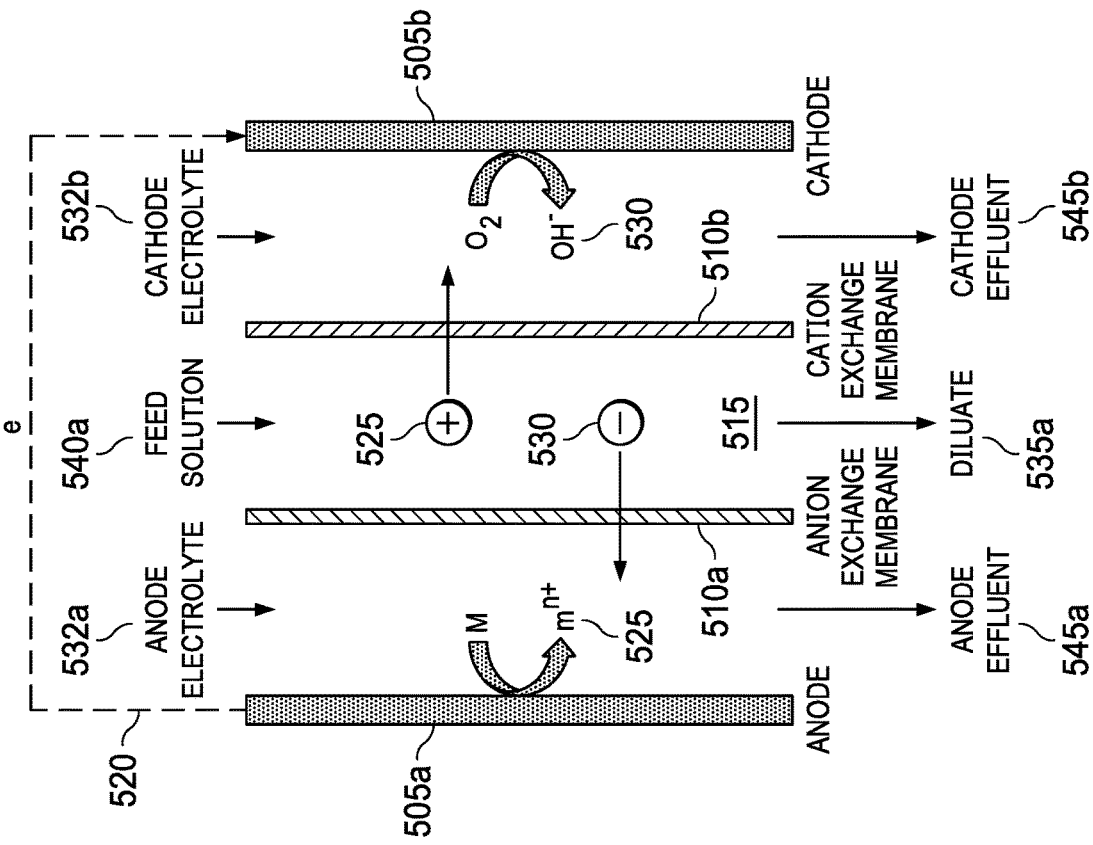

In addition to increasing the discharge current of the MADB system, multiple electrodialysis membrane pairs can be used to improve the desalination rate. Using multiple pairs allows for more desalination to occur for the same amount of current. FIGS. 15A and 15B shows the effect of going from a single membrane pair to four membrane pairs. For the same amount of current, four membrane pairs remove four times as many ions as a single membrane pair. Due to the higher electrical resistance, the discharge current will be less for four membrane pairs compared to a single pair, but the overall desalination rate and the anode desalination capacity increases. Typically, a maximum of four to five membrane pairs can be used with a Mg/air MADB cell to gain peak desalination rate and anode capacity. Using more than four to five membrane pairs leads to overall losses due to increased electrical resistance. FIG. 15A shows single-membrane-pair stack 1500, including anode 505*a*, cathode 505*b*, AEM 510*a*, CEM 510*b*, flow channel 515, external electrical circuit 520, positive ions 525, negative ions 530, anode electrolyte 532*a*, cathode electrolyte 532*b*, diluate stream 535*a*, anode effluent stream 545*a*, and cathode effluent stream 545*b*. FIG. 15B shows a four-membrane-pair stack 1505, including anode 505*a*, cathode 505*b*, AEMs 510*a*, CEMs 510*b*, flow channels 515, external electrical circuit 520, positive ions 525, negative ions 530, anode electrolyte 532*a*, cathode electrolyte 532*b*, diluate streams 535*a*, concentrate streams 535*b*, feed solution streams 540*a*, concentrate streams 540*b*, anode effluent streams 545*a*, and cathode effluent streams 545*b*.

Figure 16:
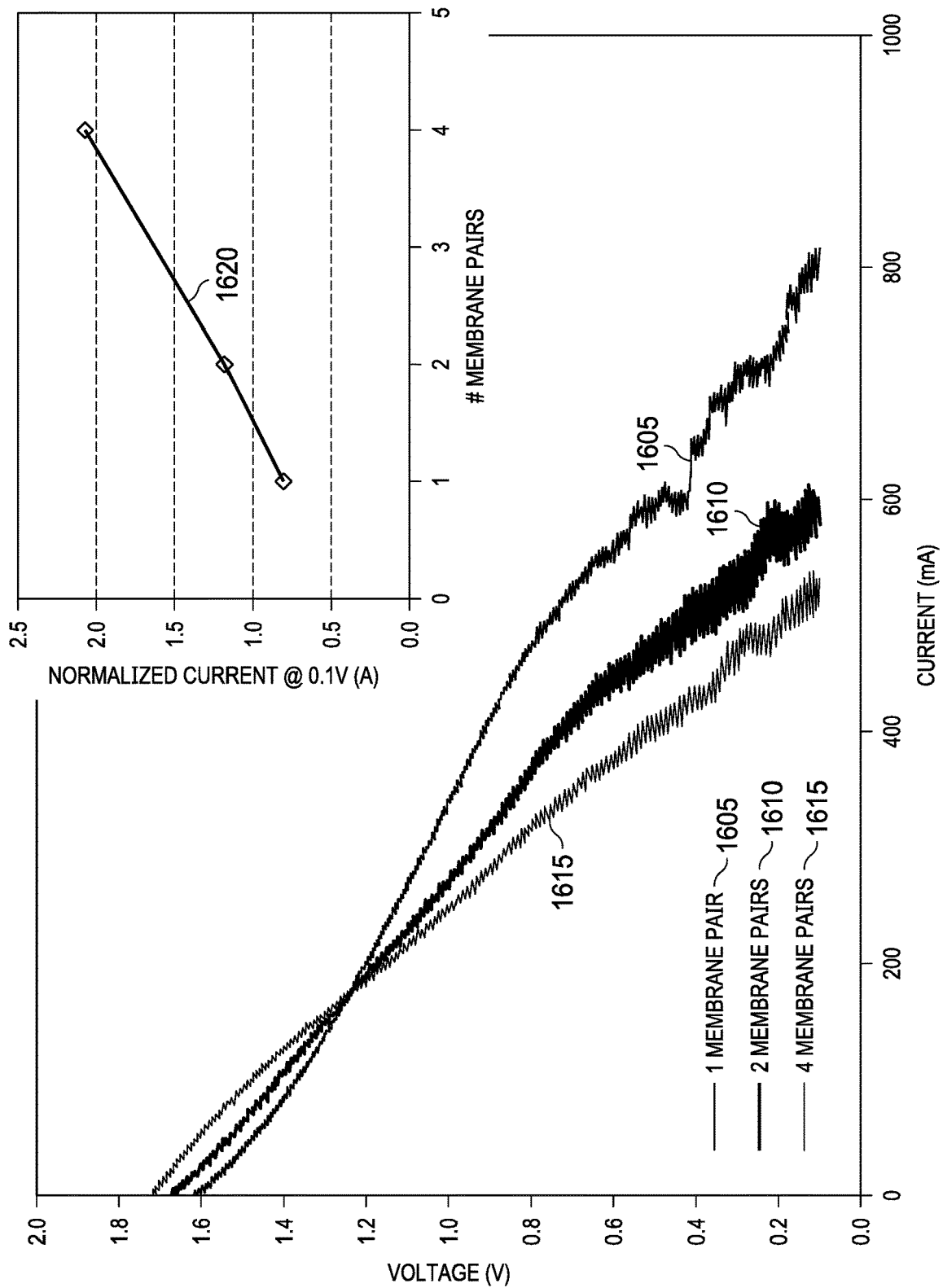
FIG. 16 depicts graphs that show the effect of increasing the number of membrane pairs in voltage vs. current and in normalized current vs. number of membrane pairs, respectively.

Traditional electrodialysis can use one hundred or more membrane pairs in a single stack. However, traditional electrodialysis is not limited by the available voltage due to the use of external power supplies and can overcome the electrical resistance increase. In contrast, MADB has very limited voltage window to use as dictated by the battery voltage supplied by the metal anode and air cathode. Due to this limited voltage, it was expected that there would be a peak number of membrane pairs which could be used to increase the desalination rate. A net benefit has been demonstrated on desalination rate by stacking up to 4 membrane pairs between a single metal anode and air cathode. As shown in FIG. 16 (and inset graph), increasing the number of membrane pairs leads to a drop in the peak discharge current due to the increase in MADB electrical resistance. Data plot 1605 shows the voltage vs. current for one membrane pair. Data plot 1615 shows the voltage vs. current for two membrane pairs. Data plot 1615 of FIG. 16 shows the voltage vs. current for four membrane pairs. In the inset graph, data plot 1620 shows the normalized current it 0.1 volts vs. the number of membrane pairs. However, the drop in current is not proportional to the increase in desalination rate leading to a net benefit.

Figure 17:
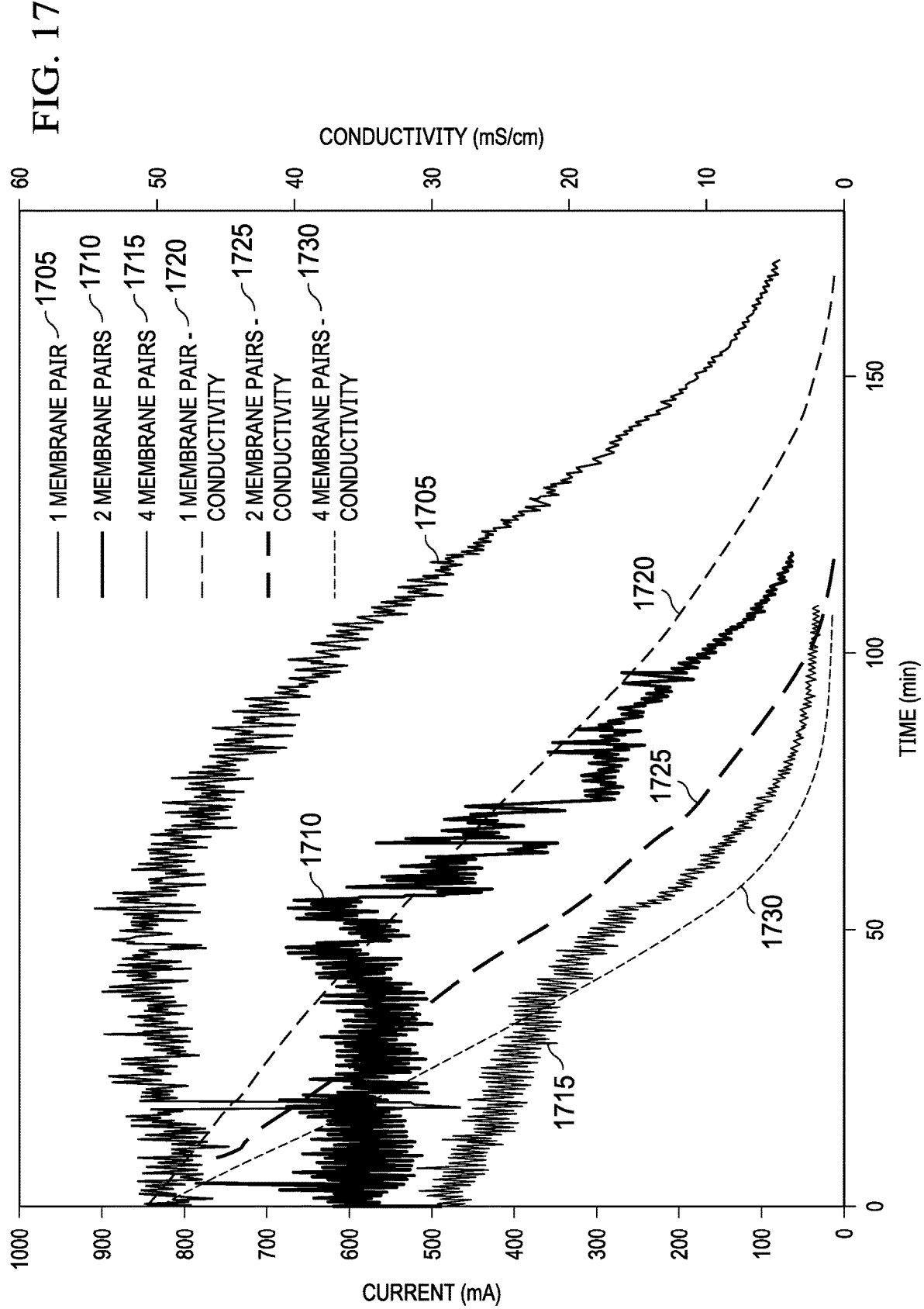
FIG. 17 is a graph that shows the effect of increasing membrane pairs on actual desalination rate.

The effect of increasing membrane pairs on actual desalination rate is shown in FIG. 17. Data plot 1705 shows current vs. time for one membrane pair. Data plot 1710 shows current vs. time for two membrane pairs. Data plot 1715 shows current vs. time for four membrane pairs. Data plot 1720 shows conductivity vs. time for one membrane pair. Data plot 1725 shows conductivity vs. time for two membrane pairs. Data plot 1730 shows conductivity vs. time for four membrane pairs. The desalination rate (as shown by the slope of the dashed line) increases with increasing membrane pairs. However, when the feed water is largely desalinated, the cell using four membrane pairs actually performed at a slower rate than two membrane pairs. This is expected since there are now multiple compartments in the cell that contain high resistance water streams.

There are three types of efficiencies that are important for practical use of MADB for desalination. The first is the anode utilization efficiency, which determines how much of the anode is converted to electrical current. The second is the current efficiency, which determines how much of the electrical current is used to remove ions in the feed solution. The third is the recovery efficiency, which is how much of the feed solution is converted to product water versus waste streams.

Maximizing the anode utilization efficiency is important for increasing the desalination capacity of the MADB system, i.e., how much desalinated water can be produced for a given quantity of anode material. Increasing the utilization efficiency increases the operational lifetime of the device before recharging is required and can decrease the overall system size and weight.

One of the issues with using metal anodes such as magnesium, aluminum, or zinc is that they undergo a side hydrolysis reaction in aqueous solutions that produces metal hydroxides and hydrogen gas as byproducts. This reaction does not contribute to electrical current generation and leads to the irreversible loss of active anode material that could be used for power generation. For some metals such as magnesium and aluminum, this hydrolysis side reaction occurs readily in neutral and acidic solutions such that up to 60% of the metal is wasted. Furthermore, the metal hydroxide byproduct is often insoluble leading to the passivation of the surface of the anode and a decrease in the desalination rate.

The primary method of limiting the effects of hydrolysis on anode utilization is to store the MADB dry so that the reaction cannot occur while the system is not in use. This approach is similar to "water activated" metal batteries which have been shown to have 10-20 year shelf lives when stored dry. If the MADB system is to be used intermittently, the anode compartment should be completely drained of any electrolyte to prevent loss of the anode material over time while not in use.

One way of limiting the hydrolysis side reaction is by controlling the discharge current of the MADB stack. Although hydrolysis occurs under open circuit conditions, the reaction is accelerated at higher currents due to a phenomenon referred to as the Negative Difference Effect (NDE). Therefore, anode utilization efficiency will be much worse for a MADB stack operated under short circuit conditions since the high discharge currents will accelerated hydrolysis through NDE. If the discharge current of the MADB stack is controlled and limited to a lower current density, acceleration of hydrolysis through NDE will be mitigated to some extent leading to better utilization efficiency, but at the cost of a lower desalination rate.

Another way of limiting the hydrolysis side reaction is the use of alloying elements or other additives in the metal anode. For example, it is known that higher aluminum and zinc content in magnesium allows can change the hydrolysis reaction rate and nature of the byproducts. For example, Mg alloys include AZ31, AZ61, and AZ91 which contain 3%, 6%, and 9% aluminum, respectively. Additives and coatings can also be used. Mercury, for example, has been shown to be very effective at suppressing the hydrolysis reaction of zinc and other metal anodes for metal-air batteries. Alternatives to mercury which are less toxic include bismuth, tin, and others.

Current efficiency for MADB is defined as the percent of current generated that is used to remove ions. There are a number of factors which can negatively affect the current efficiency including: (1) poor permselectivity of membranes, because no ion exchange membrane is perfectly selective towards anions or cations leading to the leaking of counter-ions; (2) back-diffusion of ions, because, due to concentration differences, ions often have a tendency to back-diffuse from the concentrate to the diluate; and (3) shunt currents, because, for electrochemical cells which use conductive liquid electrolytes, shunt currents can develop between electrodes.

One method of controlling losses in current efficiency due to back-diffusion of ions is to limit the concentration difference between the diluate stream and concentrate, anode electrolyte, and cathode electrolyte streams. For example, the concentration solution can be recirculated using a large volume or fed into the stack in single pass mode to prevent a large concentration difference with the diluate stream. The trade-off of this approach is that recovery percentage decreases.

Shunt currents can be managed by using proper cell and stack designs which eliminate components in electrical contact with solutions and provide long path lengths for fluids which can minimize shunt currents.

Recovery efficiency is defined by the percent of the feed water that is converted to desalinated product water. For example, large scale reverse osmosis desalination plants typically have a recovery efficiency around 50% meaning that half of the feed water is converted to desalinated product while the other half is lost in the form of brine. For MADB, the recovery efficiency is largely dictated by the volume ratio of the diluate stream to the volumes of anode electrolyte, cathode electrolyte, and brine. The volume of these solutions can be reduced by using a slow flow rate or recirculation to improve the recovery efficiency. An additional loss in diluate water that contributes to loss in recovery efficiency is electro-osmotic drag of water through the electrodialysis membranes. In practice, MADB system operating all solutions in recirculation mode can achieve recovery efficiencies of 30 to 40%.

The simplest operation mode is batch desalination. In this mode, a set quantity of feed solution is either stagnant or recirculated through the MADB stack until the desired level of desalination is achieved. This mode is the simplest to implement for applications where the salinity of the feed water is variable or unknown since only the treatment time will change for different solutions.

Figure 18A:
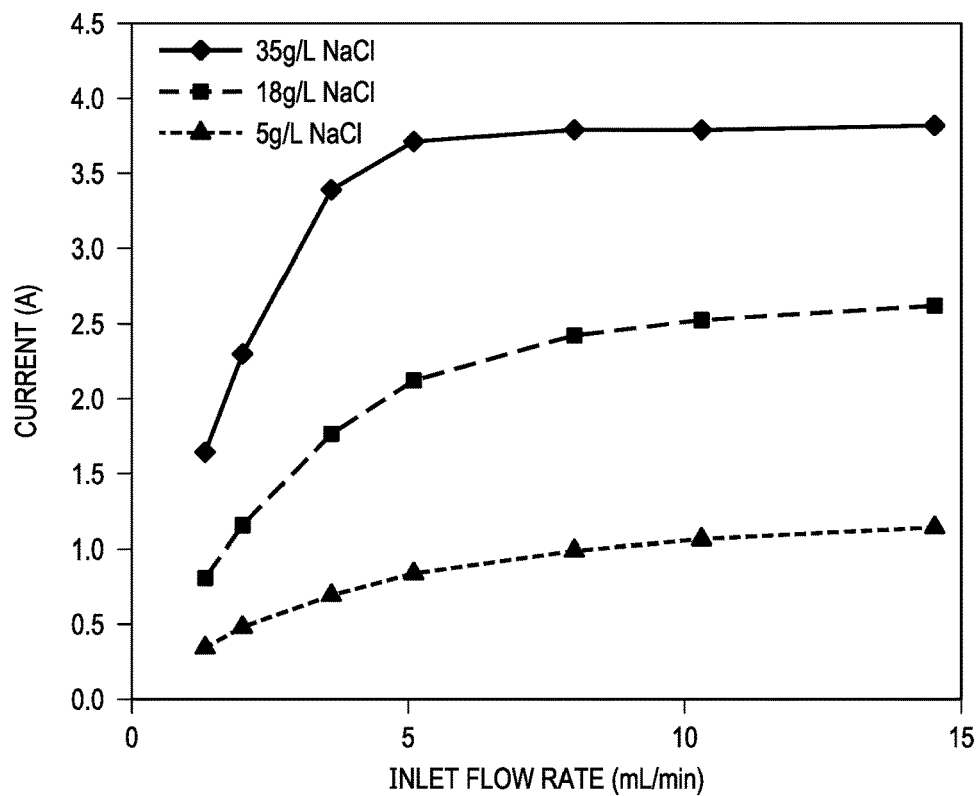
FIGS. 18A and 18B show the amount of desalination as a function of discharge current and residence time.
Figure 18B:
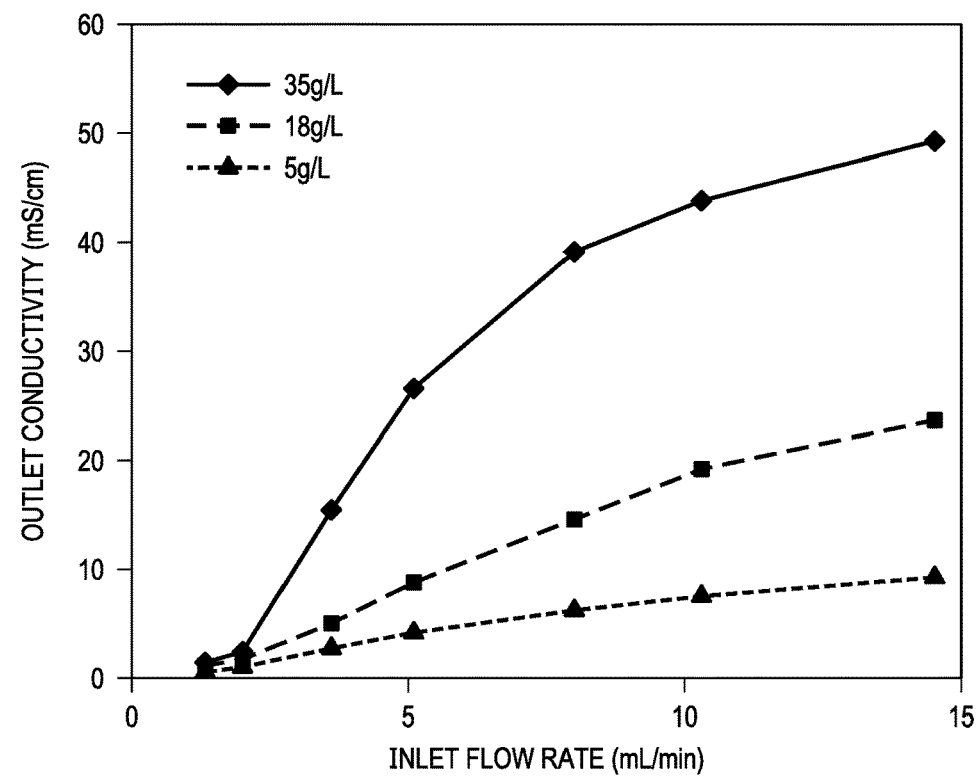

Continuous operation is where the desired desalination level is achieved in a single pass as the feed solution moves through the MADB stack. The amount of desalination that occurs is a function of discharge current and residence time which can be controlled by the flow rate through the stack, as shown in FIG. 18A and FIG. 18B. This operation mode is often the most desirable from a user standpoint but leads to inefficiencies due to large concentration differences between the inlet and outlet of the diluate stream. Additionally, operating conditions such as the inlet and outlet conductivity of the diluate stream have to be monitored and the flow rate adjusted for applications where the salinity of the feed water is variable or unknown.

Additionally, multiple MADB stacks which use different numbers of membrane pairs can be used to improve continuous desalination. For example, a MADB stack containing a large number of membrane pairs could be used as a first pass with feed waters containing high concentrations of dissolved solids. A second MADB stack with fewer membrane pairs and lower stack resistance could then be used as a "polishing" stack to more efficiently remove the remaining ions.

For continuous operation modes, the ratios of the diluate stream to the other feed streams (anode electrolyte, cathode electrolyte, and brine) affect the desalination rate and efficiency of the MADB system. For example, a high diluate flow rate relative to the other feed streams leads to high ionic concentrations in the feed streams leading to issues with concentration polarization and precipitation of salts. Alternatively, a low diluate flow rate relative to the other feed streams can limit the desalination rate and recovery efficiency. The optimum flow rate ratios are dependent on the stack design and feed water salinity. For example, with seawater and a diluate flow rate of 100 mL/min, the optimum flow rates for the anode electrolyte and cathode electrolyte would be around 50 mL/min. The ratio of about 2 to 1 (diluate to other feed streams) ensures that the anode and cathode electrolytes do not become over-concentrated while maintaining an acceptable recovery efficiency (50% for this example). If the feed water salinity is less than seawater, then the ratio of diluate flow rate to other feed streams can be increased. For example, for brackish water with 20% of the salinity of seawater, the ratio can be increased to about 10 to 1 (diluate flow rate of 500 mL/min with anode and cathode electrolyte flow rates of 50 mL/min) which will maintain a similar ion concentration in the anode and cathode electrolyte as the baseline seawater example.

A convenient means to control a MADB system operating in continuous desalination mode is to use pre-set the anode and cathode electrolyte flow rates for the highest salinity water anticipated to be used (e.g., seawater). If the feed water salinity is lower than seawater, the diluate flow rate can be increased by a factor that is inverse to the ratio of the feed water salinity relative to seawater. For example, a feed water with half the salinity of seawater can use a diluate flow rate twice that needed for seawater while keeping the anode and cathode electrolyte flow rates the same. This approach allows a single system to work with any feed water salinity and leads to improvements in desalination rate and recovery efficiency for feed waters with salinity less than seawater. Controlling the ratio of diluate flow rate to the other feed stream flow rates can be performed manually by the user or through an automated feedback control system which measures the incoming feed water salinity and adjusts the diluate flow rate accordingly.

A third option is termed "feed and bleed" and is a hybrid operation mode between batch and continuous modes. For feed and bleed, a portion of the desalinated water in the outlet stream from the MADB stack would be recirculated to the feed stream to bring the initial salinity down to a level where a single pass desalination can occur. This approach allows for a continuous output of potable water. Additionally, feed and bleed allows the MADB to be operated under consistent conditions regardless of changes in the incoming feed water salinity. For example, if the user switches from seawater to brackish water with a lower salinity, then smaller amounts of the product water would be recirculated to the feed stream. The only disadvantage of the feed and bleed approach is an increase in system complexity since it requires an additional recirculation pump, sensors, and electronics to monitor inlet and outlet salinities to control recirculation rates.

Alternatively, different operation modes can be used for the different feed streams. For example, the diluate stream can be operated in batch recirculation mode while the concentrate, anode electrolyte, and cathode electrolyte can be operated in continuous single pass mode. Any combination of the different operation modes with the different feed streams can potentially be used.

An overview of the potential balance of plant (BOP) together with an MADB system 1900 is shown in FIG. 19. The integrated energy and desalination process system 1905 receives feed water from the feed water pre-treatment process 1910 and provides desalinated water to the product water post-treatment process 1915. The fluidic subsystem 1920 serves the integrated energy and desalination process system 1905, the feed water pre-treatment process 1910, and the product water post-treatment process 1915. The user interface and controls subsystem 1925 also serves the integrated energy and desalination process system 1905, the feed water pre-treatment process 1910, and the product water post-product water post-treatment treatment process 1915. As described in the sections below, many of the components for the BOP, such as the fluidic subsystem 1920, the product water post-treatment process 1905, product water post-treatment process 1915, and the user interface and control subsystem 1925, are optional, depending on the end application requirements and overall system design.

The fluidics subsystem 1920 includes all of the components used to move, transfer, or otherwise transport fluids in the system. In the simplest embodiment, all fluidic steps can be performed by the user, i.e., manually filling and draining the device, or using a hand-operated pump, or both. Another embodiment includes the use of gravity to provide flow through the desalination system. Yet another embodiment includes the use of powered devices such as pumps including but not limited to diaphragm, piston, and centrifugal pumps. Power for pumps can be supplied through an external battery or directly using the electrochemical desalination system.

In some embodiments, the feed water for the system is pretreated, post-treated, or both. Example treatments include rough filtration or sedimentation to remove inorganic solids such as sand or larger biological contaminants. Additional filtration such as microfiltration, ultrafiltration, and nanofiltration could also be used to remove microbiological contaminants such as bacteria, cysts, and viruses. Other media such as activated carbon can be used to remove organics and other contaminants. In addition to physical pretreatments such as filtration, chemical treatments can also be used. For example, flocculating agents can be added to the feed water to assist in the removal organics and microorganisms.

In other embodiments, the feed solution is softened to remove scale-forming species such as $Mg^{2+}$ and $Ca^{2+}$. These species can cause significant scale formation and performance loss if not removed, particularly in air cathode electrolytes due to the formation insoluble hydroxides. Potential softening methods include but are not limited to ion exchange resin, lime softening, and chelation. Ion exchange resin is commonly used for softening freshwater. Cation exchange resins loaded with Na ions remove Ca and Mg ions via ion exchange. However, their softening capacity is limited and would have to be regenerated to be used long term. Lime softening using a strong base, typically calcium hydroxide, can soften hard water by precipitating out Ca and Mg species which are then settled out or filtered. Chelating compounds, such as EDTA and citrate, bind and sequester ions such as $Mg^{2+}$ and $Ca^{2+}$, preventing them from precipitating out as hydroxides or carbonates. Additionally, while not a method of softening, cation exchange membranes, which are selective to monovalent cations (e.g., $Na^+$ and $K^+$) can be used on their own or in combination with one of the above water softening methods to limit the flux of $Mg^{2+}$ and $Ca^{2+}$ ions to the cathode.

Optionally, the desalination system can include a user interface and control subsystem 1925. Potential features of such a subsystem include the ability to control the fluidic subsystem 1920 such as turning on pumps, controlling the speed of pumps, opening and closing valves, etc. Other potential features of the user interface and control subsystem 1925 could also include power conditioning and controls. Examples of power conditioning and control include the ability to start and stop the discharge of the electrochemical desalination cell, control the level of discharge, and display information about the cell such as discharge current, voltage, and power. Current discharge can be controlled by the use of manual switches, automatic relays, or manual connections of wires or electrical connectors. A resistor or load bank can be used to limit the discharge current if desired. Additional sensors may also be included to provide additional information and feedback to the user including output water conductivity, total dissolved solids (TDS), pH, temperature, etc. Because the discharge current of the electrochemical desalination cell is related to the conductivity of the water in the cell, it can be used as an indicator of solution conductivity/TDS and eliminate the need for a separate sensor.

Sensors can either be inline and automatically displayed by electronics or performed manually by the user using test strips or handheld meters.

For most applications, it is desirable for the user to know how much of the anode material has been consumed to determine when anodes need to be replaced or recharged and how much desalination capacity is left on the system. Desalination is directly correlated to the amount of current discharged through the system. An amp hour meter can be used to monitor how much current has passed and be used to estimate remaining desalination capacity and when anodes need to be replaced. The accuracy of using an amp hour meter for estimating the remaining desalination capacity can be improved by including the overall efficiency of the system including the current efficiency and anode utilization efficiency.

One advantage of the described invention is the ability to provide auxiliary power in addition to performing desalination. This can be accomplished by several different methods: for example, pulling power directly from the stack; using waste $H_2$ from the anode; or using separate metal-air battery cells specifically for power production. Auxiliary power can be used as a general power source or to power balance of plant components such as pumps, sensors, and electronics, or it can be used for other purposes.

Power may be pulled directly from the stack. In such an embodiment, system 2000, the load 2005 (e.g., a pump) is connected in series between the anode 2010 and cathode 2015 of MADB stack 2020, as illustrated by FIG. 20. MADB cells can be connected electrically in series to increase the voltage and/or a DC/DC converter can be used to supply a constant voltage to the load. In this approach, the MADB stack must be oversized to account for power used by the load that will be unavailable for desalination.

Waste $H_2$ from the anode may be used. Anodes used in metal-air batteries suffer from a side reaction, which produces hydrogen gas through a hydrolysis reaction with water. This gas can be vented. Alternatively, the hydrogen gas 2105 from an MADB stack 2110 can be fed into an external power source such as a fuel cell 2115, which also operates on air 2120, as part of an integrated system 2100, as shown in FIG. 21. Integrated system 2100 is also shown with a load 2125. The advantage of this approach is that a portion of the anode energy capacity that is lost through hydrolysis can be captured which improves overall system efficiency. In one embodiment for MADB systems using pumps and other balance of plant requiring power, a small external rechargeable battery is used for startup which is then recharged by the fuel cell. This hybrid fuel cell battery approach allows for rapid startup of balance of plant while using the fuel cell to recharge the battery and provide self-powered operation after startup.

Another approach to auxiliary power production by MADB is the use of separate but integrated metal-air battery cells in the MADB stack specifically for power production. In this embodiment, an integrated system 2200 includes one or more metal-air battery cells 2205. The one or more metal-air battery cells 2205 are placed fluidically in parallel to MADB desalination cells 2210 and located either directly in the MADB stack or as a separate stack as shown in FIG. 22, along with a load 2215. The metal-air battery cells can use the same feed waters as MADB cells but eliminate the electrodialysis components between the anode and cathode in order to maximize power production. The metal-air battery cells can use identical anodes and cathodes as MADB cells to allow for simple recharging.

Many variations on the overall concept of integrating energy generation and desalination into a single process can be envisioned. For example, a photoelectrochemical reaction such as water splitting can replace one of the electrochemical half-cell reactions to provide a hybrid system as shown in FIG. 23. Another alternative is a hybrid electrochemical and capacitive cell where one of the half-cells is electrochemical and counter electrode uses capacitive storage of ions and charge, as shown in FIG. 24. Alternatives to electrodialysis can also be envisioned. For example, the concept described in this invention can be applied to desalination cells based on ion concentration polarization. FIG. 23 shows photoelectrochemical hybrid system 2300, including photoanode 2305a, cathode 2305b, light 2307 incident on photoanode 2305a, AEM 2310a, CEM 2310b, flow channel 2315, external electrical circuit 2320, positive ions 2325, negative ions 2330, anode electrolyte 2332a, cathode electrolyte 2332b, diluate stream 2335a, anode effluent stream 2345a, and cathode effluent stream 2345b. FIG. 24 shows capacitive hybrid 2400, including anode 2405a, capacitive cathode 2405b, AEM 2410a, flow channels 2415, external electrical circuit 2420, positive ions 2425, negative ions 2430, anode electrolyte 2432a, diluate stream 2435a, feed solution stream 2440a, and anode effluent stream 2445a.

The present invention can preferentially carry out desalination using cells that have multiple membrane pairs. Below is the explanation why multiple membrane pairs are superior to a single membrane pair configuration.

Figure 25:
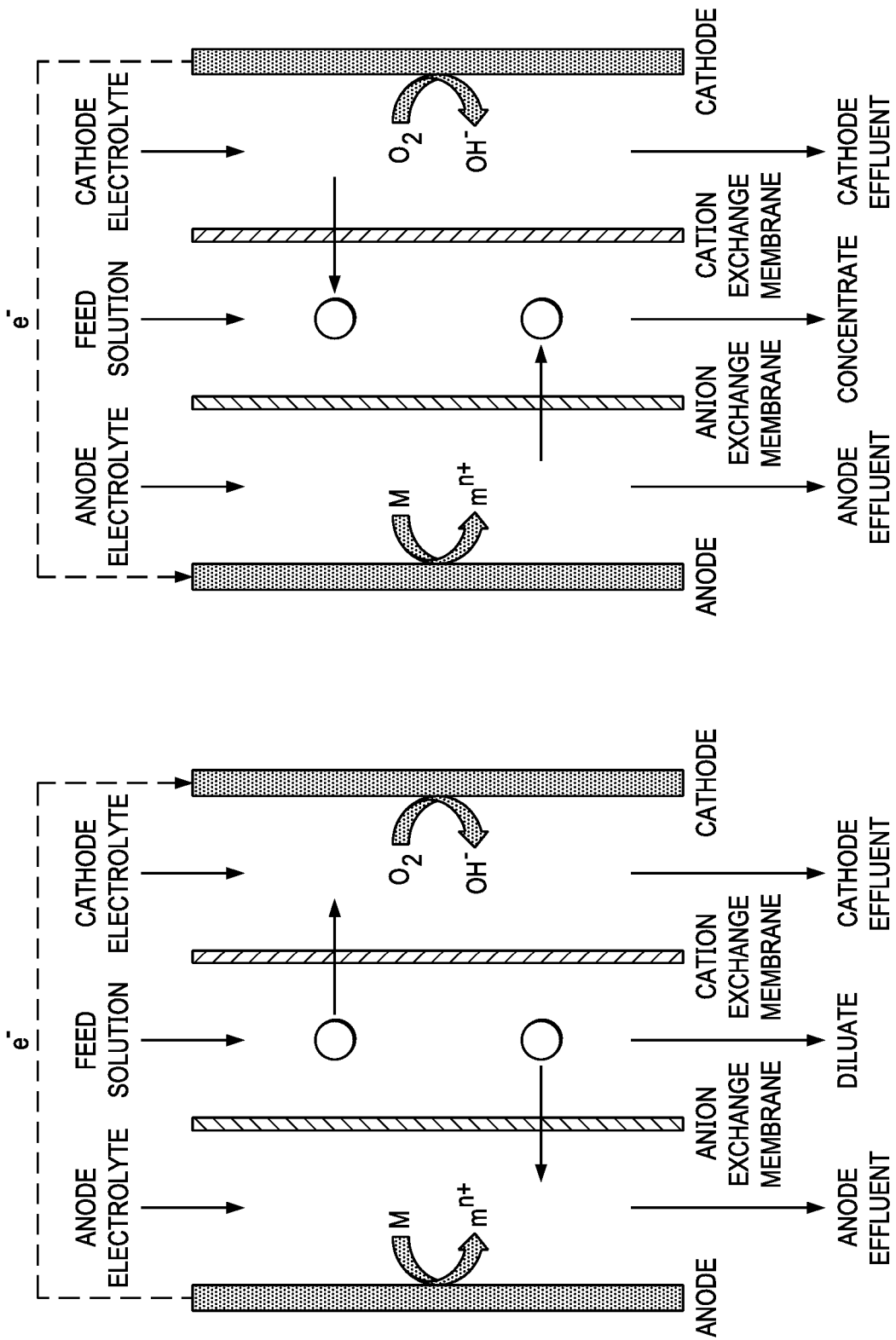
FIG. 25 shows a single membrane pair arrangement during the discharge of the metal air battery during desalination.

FIG. 25 shows a single membrane pair arrangement during the discharge of the metal air battery when desalination occurs. Electron flow is from anode to cathode. The anode undergoes dissolution due to the formation of metal ions in solution. Metal ions are predominantly retained in the anode electrolyte compartment due to the placement of the anion exchange membrane. The metal anode becomes depleted (loss of mass) over time. The reduction of gaseous oxygen occurs at the cathode. Hydroxyl ions are substantially retained within the cathode electrolyte compartment, due to the placement of the cation exchange membrane. In this configuration, the feed solution compartment is substantially deionized. The output from the feed solution compartment is a diluate.

FIG. 25 also shows the single membrane during the charge cycle. Electron flow is from cathode to anode, and involves an external source of electrical power connected electrically to the anode and cathode. The anode electrolyte contains dissolved metal ions, which are retained due to the placement of the anion exchange membrane. Electrodeposition of metal ions occurs at the anode, with increase the electrode mass. Formation of oxygen occurs at the cathode. The salt concentration in the output stream increases. Although the metal air battery is recharged, there is no diluate formed during the charge cycle (i.e. there is no desalination).

FIG. 26 shows a multiple membrane pair arrangement during the discharge of the metal air battery when desalination occurs. Electron flow is from anode to cathode. The anode undergoes dissolution due to the formation of metal ions in solution. In one embodiment, the anode electrode material is zinc. The anode reaction is $Zn \rightarrow Zn^{2+}$. Zinc metal ions are predominantly retained in the anode electrolyte compartment due to the placement of the anion exchange membrane. The zinc anode becomes depleted (loss of mass) over time. The reduction of gaseous oxygen occurs at the cathode. Hydroxyl ions are substantially retained within the cathode electrolyte compartment, due to the placement of the cation exchange membrane. This configuration involves multiple feed compartments and multiple concentration compartments, due to the placement of anion and cation exchange membranes. The feed solution compartment become substantially deionized producing a desalinated diluate output. The salt content in the concentrate compartment increases.

FIG. 26 also shows the multiple membrane pair configuration during the charge cycle. Electron flow is from cathode to anode, involving an external source of electrical power. The anode electrolyte contains dissolved $Zn^{2+}$ ions, which are retained due to the placement of the anion exchange membrane. Electrodeposition of Zn ions occurs at the anode, with increase the electrode mass. Formation of oxygen occurs at the cathode. Fluid flow of feed water and concentrate into and out of the cell is reconfigured such that the role of the feed compartments and concentrate solution compartments are reversed from the discharge cycle situation. Feed water compartment during the discharge become concentrate compartments during charging. Concentrate compartments during discharge become feed water compartments during charging. Thus, in the case of multiple membrane pairs, production of a desalinated diluate occurs simultaneously with recharging of the metal air battery. Whereas with a single membrane pair desalination occurs only during discharge.

The improvement is further understood by considering two cells side-by-side. One is configured as a single membrane pair and one is configured as a multiple membrane pair configuration. Each cell is constructed of equivalent specifications such as electrode mass, electrode area, flow rates, feed water concentration and operated with an equivalent amount of power consumed during charging. During a combined discharge cycle and charge cycle, the cell with the multiple membrane pair configuration will remove more salt from water that the single membrane cell configuration.

FIG. 27 shows how use of cells with multiple membrane pairs can improve anode utilization, desalination rate and current efficiency versus designs that use a single membrane pair. For the single membrane pair design 1 molecule of salt is removed per electron. In contrast, for multiple membrane pairs, 4 molecules of salt are removed per electron.

Comparative Examples

Desalination systems for portable applications such as drinking water production for individuals and small groups need to be compact, lightweight, and consume little to no power. Previously reported desalination batteries are unsuitable for portable applications due to their poor desalination capacities and low desalination rates. The improved performance metrics of the current invention, versus prior art, are described in this section.

The desalination capacity of a desalination battery is directly related the specific capacity of the electrodes, typically reported as mAh/g. Using the Faraday constant (26.8 Ah/mol), the specific capacity can be converted into the amount of salt removed per unit of mass of electrode material (e.g., milligrams NaCl removed per gram of electrode active material). Electrodes with high specific capacities enable desalination batteries that are either lighter/smaller or last longer than batteries using electrodes with low specific capacities. As shown in Table 4, the present invention is compared to previously reported desalination batteries utilized electrodes with low specific capacities. To date, the highest capacity desalination battery was reported by Palo Alto Research Center, Inc (PARC) which used a zinc anode with a specific capacity of 820 mAh/g and ferricyanide cathode with a specific capacity of 81 mAh/g.[1] Desalination of 1 liter of seawater with a NaCl concentration of ~0.6M would theoretically require 199 g of ferricyanide and 20 g of zinc. In reality, even larger amounts of ferricyanide and zinc would be needed due to inefficiencies from ion back-diffusion, electro-osmotic drag, and other losses. When additional system mass from current collectors, frames, separators, housing, and balance of plant is included, it is obvious that a 1 kg desalination battery system using this chemistry would unlikely produce much more than 1 kg of potable water.

Achieving a high desalination rate is also critical to creating compact and lightweight desalination systems for portable applications. The desalination rate is directly related to the discharge current density of the desalination battery, expressed as the current per area of electrode active area ($mA/cm^2$). To illustrate the effect of desalination rate on system size, consider the example above assuming the desalination of 1 liter of seawater with a NaCl concentration of ~0.6M. Removal of this quantity of salt theoretically requires an electric charge of ~16 Ah based on the Faraday constant, which corresponds to a discharge current of 16 amps to desalinate the 1 liter in an hour. As shown in Table 4, the highest current density for previously reported desalination batteries was 2.5 $mA/cm^2$ that would require an active area of 6,400 $cm^2$ to desalinate 1 liter of seawater in 1 hour. In practice, the active area would have to be even larger to account for system inefficiencies and does not include other components that would contribute to the system volume. Clearly, this area requirement would be too bulky for most portable applications.

An aspect of the present invention is the use of metal-air chemistries that overcomes the limitations of poor desalination capacities and low desalination rates. As shown in Table 4, the desalination batteries of the present invention can utilize anodes, such as Mg, with much higher specific energies than previously reported systems (2,200 mAh/g for Mg vs. 820 mAh/g for Zn). Another important aspect is the use of an air cathode, which possesses a theoretically infinite specific capacity when ambient air is used. The combination of energy dense metal anodes and an air cathode provides a much high cell voltage than previous systems and is capable of much higher discharge rates than previous desalination batteries (55 $mA/cm^2$ vs. 2.5 $mA/cm^2$). The high voltage and discharge rate of metal-air desalination batteries yields much better salt removal efficiencies and greatly reduces the size and weight of the desalination battery. Using the example of desalinating 1 liter of seawater containing 0.6M NaCl in an hour only theoretically requires 7.3 grams of Mg and an active area of 290 $cm^2$ which compares favorably to the highest performing desalination by PARC which requires 219 g of Zn and ferricyanide and an active area of 6,400 $cm^2$. Another benefit of the high cell voltage of metal-air chemistries is the ability to accommodate larger ohmic resistance in the desalination battery design. For example, multiple pairs of electrodialysis membranes can be used instead of single membrane pair, which adds ohmic resistance to the cell but can increase both the desalination rate and desalination capacity.

The metal-air desalination battery of the present invention can utilize both reversible chemistries (e.g., Zn-Air) and non-reversible chemistries (e.g., Mg-Air and Al-Air). Both reversible and non-reversible versions can utilize mechanical replacement of the anode to provide recharging. Only the metal anode needs to be replaced for recharging since the air cathode has an infinite specific capacity. Reversible versions such as Zn-Air also have the option of being electrically recharged with an external power supply. Electrically rechargeable Zn-Air batteries are well known in the state of the art.

The desalination battery of the present invention can also use other configurations such as a non-reversible anode such as Mg or Al combined with a solid cathode. Suitable solid cathodes include, but is not limited to silver chloride, lead chloride, cuprous iodide, cuprous thiocyanate, and cuprous chloride which possess specific capacities of 187 mAh/g, 193 mAh/g, 141 mAh/g, 220 mAh/g, and 271 mAh/g, respectively.[2] It should be noted that these solid cathodes have much higher specific capacities (and therefore desalination capacities) compared to the liquid cathodes and intercalation cathodes used in previous desalination batteries as listed in Table 4. These configurations are advantageous for applications where access to ambient air may be limited but a desalination battery with small size and weight is needed. Additionally, these cathodes circumvent potential issues with source waters that contain high concentrations of divalent cations such as $Mg^{2+}$ and $Ca^{2+}$ that can cause scaling of air cathodes if not removed prior to desalination.

limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the

TABLE 4

Comparison of the metal-air desalination battery of the present invention to previously reported desalination batteries. The present invention is compared to data adapted from a table in Desai et al. (2018).

| System | Sp. Capacity (mAh/g) | $E_{cell}$ (V) | Salinity (ppt) | Salt Removal (%) | SEC (Wh/mol NaCl)* | Cycles | j (mA/cm$^2$) | Reference |
|---|---|---|---|---|---|---|---|---|
| Non-Reversible Desalination Metal-Air Battery (Air Cathode) | | | | | | | | |
| Mg\|Air | 2200 (anode) Inf. (cathode)† | 1.6 | 1-100 | >99.5% | N/A | N/A | up to 55 | Present Invention |
| Reversible Desalination Hybrid Flow Battery (Liquid Cathode) | | | | | | | | |
| Zn\|K$_3$[Fe(CN)$_6$] | 820 (anode) 81.4 (cathode) | 1.25 | 35-100 | 86% | 4.1-8.6 | 7 | 0.7-2.5 | PARC[1,2] |
| Reversible Solid Electrode Desalination Battery (Intercalation Cathode) | | | | | | | | |
| Ag\|Na$_{0.5}$MnO$_2$ | 249 (anode) 35 (cathode) | 0.30 | 35 | 25% | 1.9 | 1 | 0.5 | [3] |
| Ni$_x$[Fe(CN)$_6$]$_y$\|Fe$_x$[Fe(CN)$_6$]$_y$ | 27.5 | 0.25-0.45 | 29 | 40% | 1.8 | 100 | 0.5 | [4] |
| BiOCl\|NaTi$_2$(PO$_4$)$_3$ | 384 (anode) 63 (cathode) | 0.55-0.75 | 35 | 20% | 31.8 (Na$^+$) 95.5 (Cl$^-$) | 50 | 2 | [5] |
| BiOCl\|Na$_{0.44}$MnO$_2$ | 384 (anode) 35 (cathode) | ±1.5 | 0.8 | 4% | 26.9 (ion unclear) | 50 | 0.13-0.67 | [6] |

*Calculated as the energy consumed during the charge cycle (salination) minus the energy generated during the discharge cycle (desalination). Only applicable to reversible chemistries.
†Air cathodes possess a theoretically infinite specific capacity assuming ambient air is used.
[1]Volkel, A. R. et al. Redox desalination system for clean water production and energy storage. U.S. Pat. No. 9,673,472B2 (2017).
[2]Desai, D. et al. Electrochemical Desalination of Seawater and Hypersaline Brines with Coupled Electricity Storage. ACS Energy Letters 3, 375-379, doi: 10.1021/acsenergylett.7b01220 (2018).
[3]Pasta, M., Wessells, C. D., Cui, Y. & La Mantia, F. A Desalination Battery. Nano Letters 12, 839-843, doi: 10.1021/nl203889e (2012).
[4]Lee, J., Kim, S. & Yoon, J. Rocking Chair Desalination Battery Based on Prussian Blue Electrodes. ACS Omega 2, 1653-1659, doi: 10.1021/acsomega.6b00526 (2017).
[5]Nam, D.-H. & Choi, K.-S. Bismuth as a New Chloride-Storage Electrode Enabling the Construction of a Practical High Capacity Desalination Battery. Journal of the American Chemical Society 139, 11055-11063, doi: 10.1021/jacs.7b01119 (2017).
[6]Chen, F. et al. Dual-ions electrochemical deionization: a desalination generator. Energy & Environmental Science 10, 2081-2089, doi: 10.1039/C7EE00855D (2017).

The skilled artisan will recognize that embodiments of the present invention provide systems and methods of integral, simultaneous desalination and electrical power generation.

It will be understood that particular embodiments described herein are shown by way of illustration and not as meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A method for integrated energy generation and desalination comprising:
providing an anode and a cathode, wherein the cathode is an air cathode and the anode comprises metal, wherein the metal comprises at least one of: (1) magnesium, aluminum, or zinc, mercury, bismuth, tin, or some combination thereof, or (2) Mg alloys selected from AZ31, AZ61, and AZ91 that contain 3%, 6%, and 9% aluminum, respectively; or (3) the metal is coated with bismuth, tin, or mercury;
providing a desalination device operably coupled to establish an electrical potential between the anode and the cathode when the desalination device is operating;
providing water containing dissolved solids, thereby establishing the electrical potential between the anode and the cathode;
reducing a salinity of the water by supplying the water to the desalination device; and
generating electrical power by reducing the salinity of the water.

2. The method of claim 1, wherein the desalination device is an electrodialysis device, an electrodeionization device, or an ion concentration polarization device.

3. The method of claim 1, wherein the anode is at least one of (1) at least partially surrounded by a filter to trap sludge, or (2) removable or replaceable.

4. The method of claim 1, wherein an anode electrolyte is divided into a first and a second flow field by a porous separator situated parallel to the anode, wherein a first flow field is a relatively low-velocity flow field adjacent to the anode, and a second flow field is a relatively high-velocity flow field.

5. A method for integrated energy generation and desalination comprising:
providing a volume of water containing dissolved solids;
providing an anode and a cathode in fluid communication with the volume of water, wherein the anode and the cathode are operable to be connected to an electrical load located outside the volume of water, wherein the cathode is an air cathode and the anode comprises metal, wherein the metal comprises at least one of: (1) magnesium, aluminum, zinc, mercury, bismuth, tin, or some combination thereof, or (2) Mg alloys selected from AZ31, AZ61, and AZ91 that contain 3%, 6%, and 9% aluminum, respectively; or (3) the metal is coated with bismuth, tin, or mercury;

filling at least a portion of a space between the anode and the cathode with at least a portion of the volume of water;

forming positive ions at an anode surface and forming negative ions at a cathode electrode, thereby establishing an electrical potential between the anode and the cathode; and removing at least a portion of the dissolved solids from the volume of water.

6. The method of claim 5, wherein the forming positive ions at the anode surface comprises the fluid communication of an electrolyte and the anode surface, or wherein the forming negative ions at a cathode surface comprises establishing fluid communication between oxygen and the cathode surface.

7. The method of claim 5, further comprising providing at least one pair of ion exchange membranes disposed between the anode and the cathode, the pair of ion exchange membranes comprising an anion exchange membrane and a cation exchange membrane.

8. The method of claim 5, wherein the removing at least a portion of the dissolved solids from the volume of water comprises using an electrodialysis device, an electrodeionization device, or an ion concentration polarization device.

9. The method of claim 5, wherein the anode is at least one of (1) at least partially surrounded by a filter to trap sludge, or (2) removable or replaceable.

10. The method of claim 5, wherein an anode electrolyte is divided into a first and a second flow field by a porous separator situated parallel to the anode, wherein a first flow field is a relatively low-velocity flow field adjacent to the anode, and a second flow field is a relatively high-velocity flow field.

11. A system for integrated energy generation and desalination comprising:
    an electrical battery comprising an anode and a cathode, wherein the electrical battery comprises a metal-air battery, wherein a metal of the metal-air battery comprises at least one of (1) magnesium, aluminum, or zinc, mercury, bismuth, tin, or some combination thereof, or (2) Mg alloys selected from AZ31, AZ61, and AZ91 that contain 3%, 6%, and 9% aluminum, respectively; or (3) the metal of the metal-air battery is coated with bismuth, tin, or mercury; and
    a device for electrically-driven desalination coupled to the anode and the cathode to establish an electrical potential between the anode and the cathode when the device for electrically-driven desalination is operating.

12. The system of claim 11, wherein the device for electrically-driven desalination comprises an electrodialysis device.

13. The system of claim 11, wherein the anode is at least one of (1) at least partially surrounded by a filter to trap sludge, or (2) removable or replaceable.

14. The system of claim 11, wherein an anode electrolyte is divided into a first and a second flow field by a porous separator situated parallel to the anode, wherein a first flow field is a relatively low-velocity flow field adjacent to the anode, and a second flow field is a relatively high-velocity flow field.

15. A system for integrated energy generation and desalination comprising:
    an anode operable to be placed in fluid communication with an anode electrolyte wherein the anode comprises at least one of (1) magnesium, aluminum, zinc, mercury, bismuth, tin, or some combination thereof, or (2) Mg alloys selected from AZ31, AZ61, and AZ91 that contain 3%, 6%, and 9% aluminum, respectively; or (3) the anode is coated with bismuth, tin, or mercury;
    a cathode operable to be placed in fluid communication with a cathode electrolyte and an oxygen supply;
    one or more electrical conductors electrically connecting the anode and an electrical load to the cathode; and
    at least one pair of ion exchange membranes comprising an anion exchange membrane and a cation exchange membrane positioned adjacent to each other,
        wherein the at least one pair of ion exchange membranes are positioned in a space between the anode and the cathode with each anion exchange membrane positioned nearer the anode and each cation exchange membrane positioned nearer the cathode, and
        wherein at least one space between the anion exchange membrane and the cation exchange membrane of each pair of ion exchange membranes is configured to receive a volume of water containing dissolved solids.

16. The system of claim 15, wherein the anode is placed in fluid communication with the anode electrolyte; or
    wherein the cathode is placed in fluid communication with the cathode electrolyte and the oxygen supply.

17. The system of claim 15, wherein the anode is at least one of (1) at least partially surrounded by a filter to trap sludge, or (2) removable or replaceable.

18. The system of claim 15, wherein the anode electrolyte is divided into a first and a second flow field by a porous separator situated parallel to the anode, wherein a first flow field is a relatively low-velocity flow field adjacent to the anode, and a second flow field is a relatively high-velocity flow field.

19. A method for integrated energy generation and desalination comprising:
    providing an anode and a cathode, wherein the cathode is an air cathode and the anode comprises metal, wherein the metal comprises at least one of (1) magnesium, aluminum, zinc, mercury, bismuth, tin, or some combination thereof, or (2) Mg alloys selected from AZ31, AZ61, and AZ91 that contain 3%, 6%, and 9% aluminum, respectively; or wherein the metal is coated with bismuth, tin, or mercury;
    providing a desalination device operably coupled to establish an electrical potential between the anode and the cathode when the desalination device is operating;
    providing water containing dissolved solids, thereby establishing the electrical potential between the anode and the cathode;
    reducing a salinity of the water by supplying the water to the desalination device;
    generating electrical power; and
    switching between the step of reducing the salinity of the water and the step of generating electrical power to provide integrated energy generation and desalination.

* * * * *